(12) United States Patent
Doshi et al.

(10) Patent No.: US 12,537,794 B2
(45) Date of Patent: Jan. 27, 2026

(54) BROKERED NETWORK TRAFFIC MONITORING AND THREAT ANALYSIS

(71) Applicant: Intel Corporation, Santa Clara, CA (US)

(72) Inventors: Kshitij Arun Doshi, Tempe, AZ (US); Francesc Guim Bernat, Barcelona (ES); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 17/711,933

(22) Filed: Apr. 1, 2022

(65) Prior Publication Data
US 2023/0010406 A1    Jan. 12, 2023

(51) Int. Cl.
*H04L 9/40* (2022.01)

(52) U.S. Cl.
CPC ...... *H04L 63/0218* (2013.01); *H04L 63/0263* (2013.01); *H04L 63/1408* (2013.01)

(58) Field of Classification Search
CPC ............ H04L 63/0218; H04L 63/0263; H04L 63/1408; H04L 63/0428; H04L 63/1433; H04L 63/1416
See application file for complete search history.

(56) References Cited

U.S. PATENT DOCUMENTS

| | | | |
|---|---|---|---|
| 2004/0117478 A1* | 6/2004 | Triulzi | H04L 63/1416 709/224 |
| 2009/0316590 A1* | 12/2009 | Lund | H04L 43/026 370/252 |
| 2012/0230210 A1* | 9/2012 | Reed | H04L 43/12 370/252 |

(Continued)

OTHER PUBLICATIONS

Wikipedia article for "Hash table" article dated May 8, 2020 (20 pages) https://en.wikipedia.org/w/index.php?title=Hash_table&oldid=955570514 (Year: 2020).*

(Continued)

*Primary Examiner* — Thomas A Gyorfi
(74) *Attorney, Agent, or Firm* — Schwegman Lundberg & Woessner, P.A.

(57) ABSTRACT

The subject matter described herein provides technical solutions for technical problems facing computing network security. Technical solutions described herein include adaptive sniffing of networking traffic, such as using a brokered network traffic sniffing framework. A brokered sniffing framework may be used to provide dynamic adjustment of network access points and network traffic sampling queries, such as by providing dynamic adjustment in response to changes to the network topology or network traffic. The brokered sniffing framework may provide improved statistical sampling of network traffic using improved network traffic telemetry, such as by modifying a statistical profile of network traffic contents that are collected. The network (Continued)

traffic telemetry may be used to identify various changes in network traffic, such as by identifying statistically significant changes in latencies, bandwidths, or other data center performance metrics.

25 Claims, 17 Drawing Sheets

(56) References Cited

U.S. PATENT DOCUMENTS

| | | | | |
|---|---|---|---|---|
| 2014/0317735 | A1* | 10/2014 | Kolbitsch | H04L 63/145 726/23 |
| 2018/0295187 | A1* | 10/2018 | Sabata | H04W 12/009 |
| 2019/0109820 | A1* | 4/2019 | Clark | H04L 9/0861 |
| 2019/0245873 | A1* | 8/2019 | Wu | H04L 41/0681 |
| 2019/0306034 | A1* | 10/2019 | Shanbhag | H04W 12/60 |
| 2020/0106684 | A1* | 4/2020 | Koffman | H04W 24/08 |

OTHER PUBLICATIONS

"Packet Sniffing", [Online]. Retrieved from the Internet: <https://web.archive.org/web/20220929225349/https://www.sciencedirect.com/topics/computer-science/packet-sniffing>, (archived on Sep. 29, 2022), 18 pages.

Chen, Xiaoqi, et al., "BeauCoup Answering Many Network Traffic Queries One MemoryUpdate at a Time", Proceedings of the Annual conference of the ACM Special Interest Group on Data Communication on the applications, technologies, architectures, and protocols for computer communication. 2020., (Jul. 30, 2020), 14 pages.

Flajolet, Philippe, et al., "Birthday Paradox Coupon Collectors Caching Algorithms andG.self organizing search", Discrete Applied Mathematics 39.3 (1992): 207-229., (Nov. 11, 1992), 23 pages.

Tan, Lizhuang, et al., "In-band Network Telemetry: A Survey", In-band Network Telemetry: A Survey, (Feb. 26, 2021), 20 pages.

* cited by examiner

BROKERED NETWORK TRAFFIC MONITORING AND THREAT ANALYSIS

TECHNICAL FIELD

Embodiments described herein relate to network communication packet monitoring.

BACKGROUND

Computing networks may be vulnerable to various types of network cyberattacks. FIG. 1 shows an example computing network that includes one or more computing devices 105 connected to a first router 110 or a second router 115. One or more firewalls 120 and 125 may be positioned at major network communication ingress or egress points (e.g., access points) where network traffic is split or blended into different sub-networks, such as between routers 110 and 115, and a switch 130 connected to the internet 135. The firewalls 120 and 125 may be used to address cyberattacks, such as by filtering connections to or from suspect sites, or by limiting specific combinations of ports, protocols, or source-destination combinations can be communicated between a firewalled domain and an external network. Firewalls may provide a coarse-grained network filtering function, but may not provide protections against attacks using combinations of ports or protocols that are not filtered by a given firewall.

FIG. 2 shows an example secure network channel 200. A first user 210 may communicate with a second user 220 via a secure communication channel 230. The secure channel 230 may include a secure sockets layer (SSL) channel, a transport layer security (TLS) channel, a datagram TLS (DTLS), or another type of secure communication channel. In an example, the secure channel 230 may use cryptography 240 to prevent a cyber attacker 250 from accessing network traffic communicated between the first user 210 and the second user 220. Secure channels provide a secure point-to-point channel, but may not protect against attacks using channels other than the established secure channel 230. What is needed is improved protection against computing network cyberattacks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
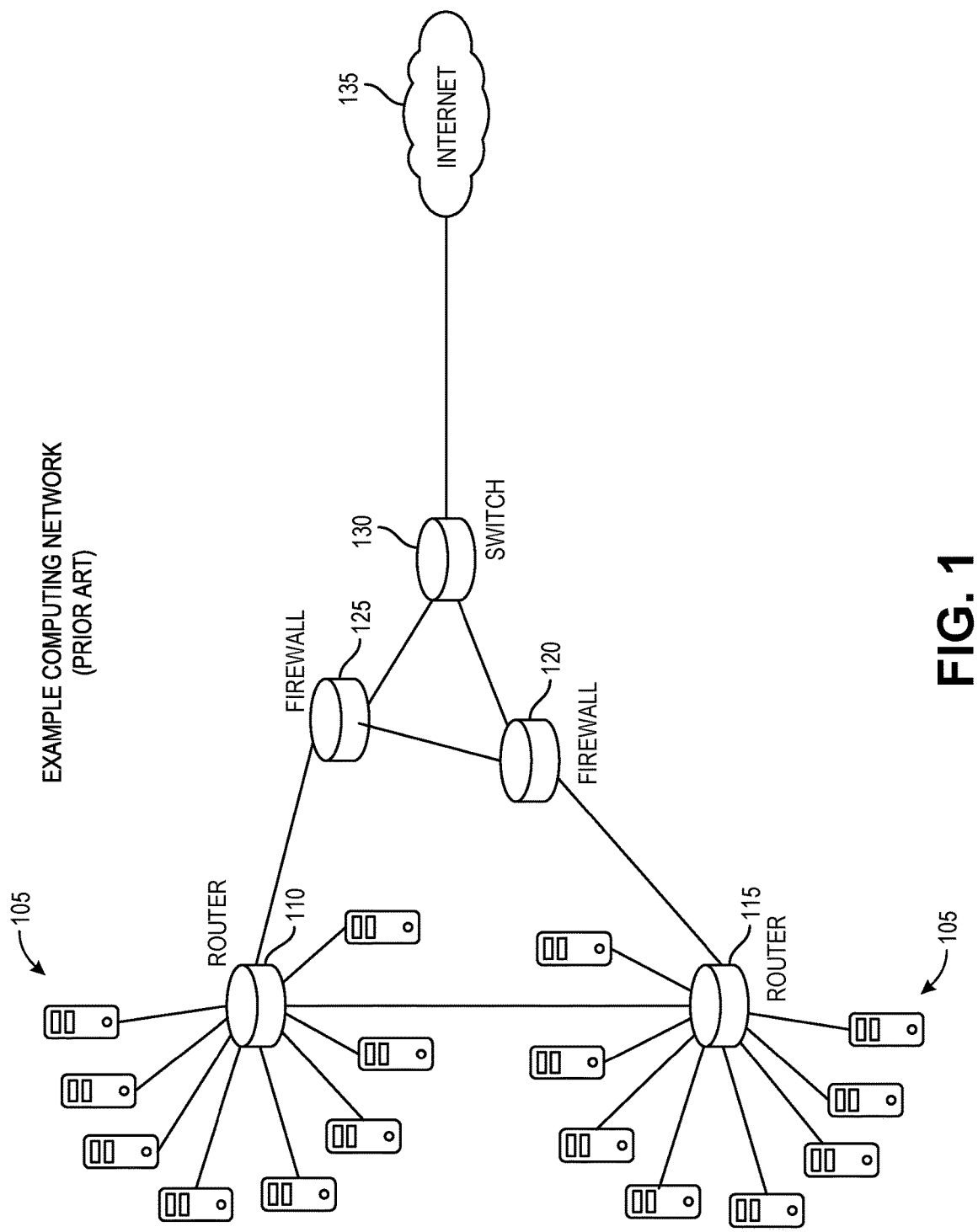
FIG. 1 shows an example computing network.
Figure 2:
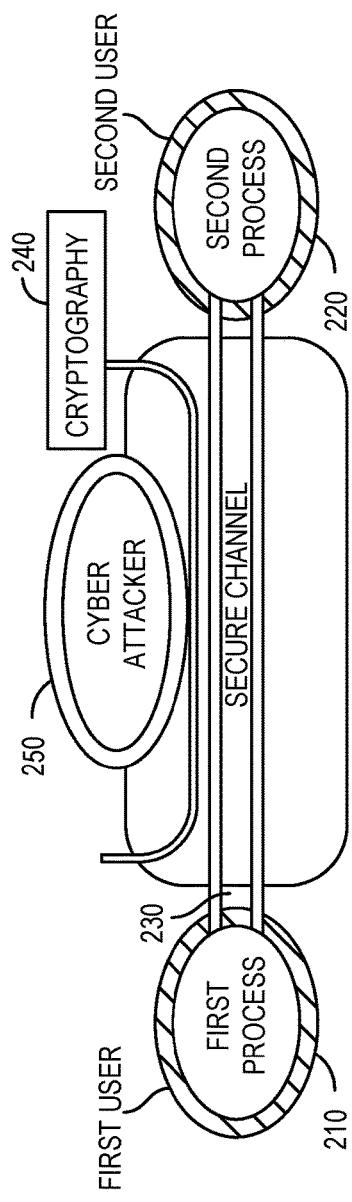
FIG. 2 shows an example secure network channel.

The subject matter described herein provides technical solutions for technical problems facing computing network security. Technical solutions described herein include adaptive sniffing (e.g., monitoring) of networking traffic, such as using a brokered network traffic sniffing framework. The brokered network traffic sniffing framework may be used to implement and update a network of packet sniffers (e.g., packet analyzers, network analyzers, protocol analyzers). Each packet sniffer may be configured to capture network traffic, and may be further configured as a sniffer agent to filter, decrypt, analyze, transform, store, or transmit captured network traffic. The network of packet sniffers may include statically configured sniffers that may be switched on or off, and may include dynamically configured (e.g., adaptive) sniffers that may adjust settings based on received configuration inputs or based on sniffer traffic analysis (e.g., if the sniffer is not capturing a target network packet).

This adaptive network monitoring may be performed at multiple network ingress or egress points without breaking security, such as by monitoring under administrative control that directs its activation or deactivation simultaneously at multiple network locations. This monitoring may reduce or eliminate privacy intrusions, such as by providing a secure interface (e.g., application programming interface (API) for specifying network queries. These network queries may be specified by security middleware, and may be parsed and converted into a statistical protocol (e.g., recipe) for network traffic collection at each access point of interest. This statistical network traffic collection may be used across multiple queries to sample packets selectively, such as by selecting packets that satisfy one or more query constraints while reducing or eliminating collection of redundant samples.

A brokered sniffing framework may be used to provide dynamic adjustment of network access points and network traffic sampling queries, such as by providing dynamic adjustment in response to changes to the network topology or network traffic. The brokered sniffing framework may provide improved statistical sampling of network traffic using improved network traffic telemetry, such as by modifying a statistical profile of network traffic contents that are collected. The network traffic telemetry may be used to identify various changes in network traffic, such as by identifying statistically significant changes in latencies, bandwidths, or other data center performance metrics. This brokered sniffing framework may be used to provide identification and prevention of security issues, performance issues, or data loss issues.

In the following description, for purposes of explanation, numerous specific details are set forth in order to provide a thorough understanding of some example embodiments. It will be evident, however, to one skilled in the art that the present disclosure may be practiced without these specific details.

Figure 3:
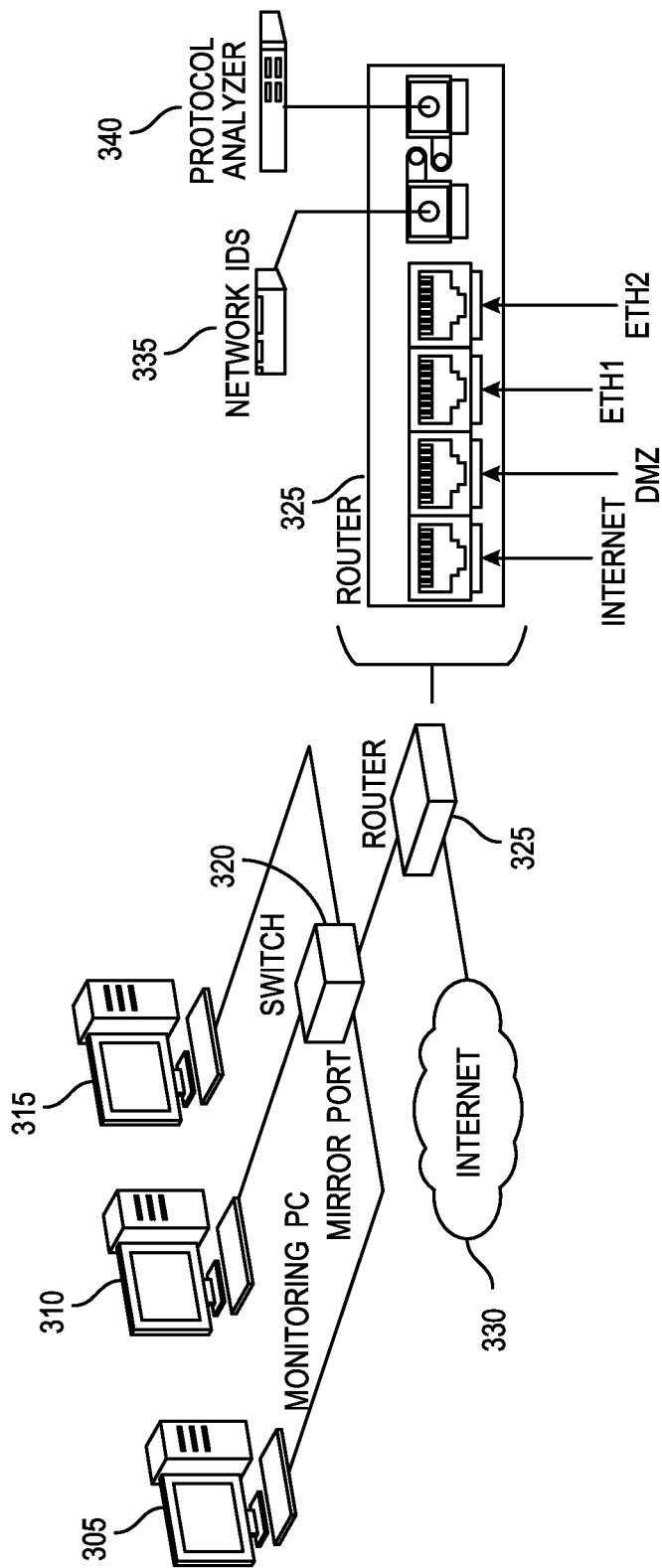
FIG. 3 is a block diagram illustrating a network sniffing architecture, according to an embodiment.

FIG. 3 is a block diagram illustrating a network sniffing architecture 300, according to an embodiment. Architecture 300 includes a network with one or more computers 305, 310, and 315. The computers 305, 310, and 315 may be connected through a switch 320 and a router 325 to the internet 330. In an example, computer 305 may be used as a monitoring computer (e.g., sniffer), which may operate in a "promiscuous" mode to accept network traffic flowing through the subnet, to select (e.g., filter) a subset of the network traffic according to monitoring criteria, then log or stream the selected network traffic for analysis.

This adaptive network monitoring may include related network monitoring actions, such as policing of accesses, content analysis, usage analysis, protocol analysis, packet analysis, logging and auditing, network honeypotting or honeynetting (e.g., operation of devices or networks with intentional vulnerabilities to attract cyberattacks), legally compliant network tracing, and other related network monitoring actions. This brokered sniffing framework may be implemented using computer 305, using an intrusion detection system (IDS) 335, using a protocol analyzer 340, using an intrusion prevention system (IPS) (not shown), using other networked devices, or using an adaptive firewall shown in FIG. 4.

Figure 4:
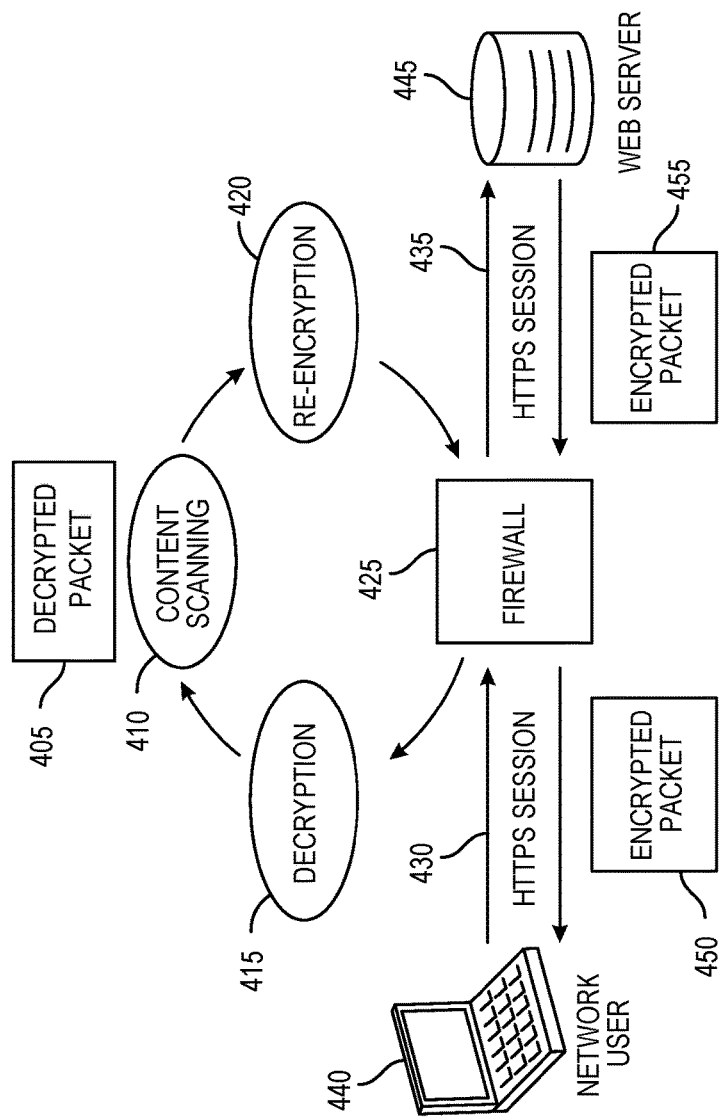
FIG. 4 is a block diagram illustrating a firewall sniffing architecture, according to an embodiment.

FIG. 4 is a block diagram illustrating a firewall sniffing architecture 400, according to an embodiment. Architecture 400 may be used by a network user 440 that communicates by sending one or more encrypted packets 450 through a first secure Hypertext Transfer Protocol (HTTPS) session 430 to a firewall 425, and the firewall 425 forwards the encrypted packets 455 though a second HTTPS session 435 to a web server 445. Similarly, the web server 445 may communicate through second HTTPS session 435, firewall 425, and first HTTPS session 430 back to network user 440. A network sniffer may be implemented on firewall 425, which may be used to perform decryption 415, content scanning 410 of the decrypted packet 405, and then re-encryption 420 to reintroduce the encrypted packet back into one or more of the first secure HTTPS session 430 or the second secure HTTPS session 435.

The architecture 400 may use the firewall 425 to provide adaptive monitoring using one or more of network traffic filtering or network traffic capture operations. The scale of network operations may expand over time, such as based on additions or other changes to firewall sniffing architecture 400. These network changes may include the addition of subnets, virtual private networks (VPNs), applications executing over shared (e.g., multi-tenant) infrastructure in edge clouds and near-edge clouds, or other network changes. The architecture 400 may adapt to these network changes, such as by providing time-varying and context-dictated or scenario-dictated circumstances for identifying which packets or network traffic to filter, identifying what network data to extract and analyze, or identifying thresholds to apply when subjecting a given network flow or set of network flows to increased scrutiny. By dynamically adjusting network traffic capture, the architecture 400 may avoid the inefficient and impractical alternative of capturing and scrutinizing all network traffic.

Figure 5:
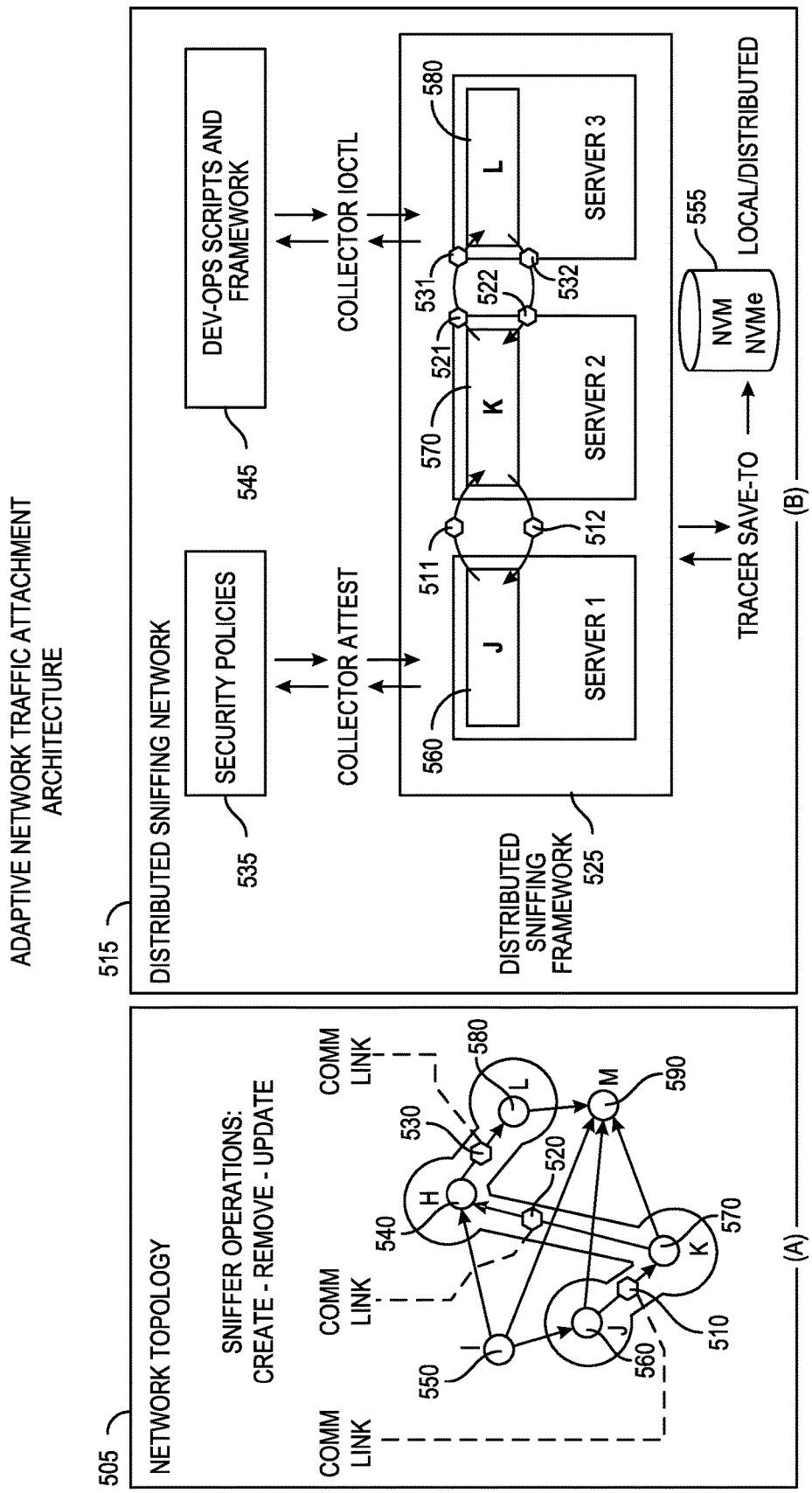
FIG. 5 is a block diagram illustrating an adaptive network traffic attachment framework, according to an embodiment.

FIG. 5 is a block diagram illustrating an adaptive network traffic attachment architecture 500, according to an embodiment. Architecture 500 may be used to select and monitor network traffic according to paths or flows of interest, and to create, attach, update, or remove network traffic sniffers to various network locations. Architecture 500 includes a network topology 505 that includes network server H 540, server I 550, server J 560, server K 570, server L 580, and server M 590. Various communication links may be established between pairs of severs, such as first communication link 510, second communication link 520, and third communication link 530.

In the example shown in network topology 505, server H 540 may be a server that is considered to be off limits for network monitoring purposes, such as a server in a different organization or a server that is not subject to administrative control of a party that controls the remainder of the network. To monitor relevant network traffic without implementing network monitoring directly on server H 540, network traffic sniffers may be used to monitor traffic on each of the first communication link 510, the second communication link 520, or the third communication link 530. The network traffic sniffer on the first communication link 510 may be established cooperatively between server J 560 and server K 570. The network traffic sniffer on the second communication link 520 and the third communication link 530 may be established unilaterally at server K 570 and server L 580 without the involvement of server H 540. The brokered sniffing framework may be implemented as a distributed network intermediary service, and may be used to create, remove, or update sniffing operations at one or more of these links. This brokered sniffing framework makes it possible for a generalized sniffing framework to intercept (e.g., actively or passively) traffic flows on those links within various existing security policies and parameters.

In the example shown in distributed sniffing network 515, interface 511 and interface 512 may be monitored cooperatively between server J 560 and server K 570. This cooperative monitoring may include server J 560 and server K 570 providing a broker with network traffic components intercepted by brokering software components, such as brokering software components running at server J 560, at server K 570, or at other servers within the subnet of server J 560 or the subnet of server K 570. Network traffic sniffers may be established unilaterally at server K 570 and server L 580 without the involvement of server H 540, such as using sniffers 521 and 522 on server K 570 or sniffers 531 and 532 on server L 580. Network traffic sniffers may be modified or added in response to collected network traffic. In an example, if network traffic analysis determines that sniffers 521 and 522 on server K 570 are not collecting a targeted network packet, sniffers 531 and 532 may be added at server L 580 in an effort to capture the targeted network packet.

Traffic collected at one or more of the servers within distributed sniffing framework 525 may be encrypted or obfuscated, and may be signed (e.g., attested to) and timestamped by a broker. The encryption, obfuscation, and attestation of traffic may be specified to the brokering service by a human or software-based administrator. The distributed sniffing framework 525 may insert various markers or names into the collected traffic data so that it may be retrieved on the basis of such markers or names, and so that it may be filtered by various attributes (e.g., collection time, collection server). This prepared stream of network traffic information (e.g., sniffer trace) may be provided to a tracer service and stored, such as on high-speed durable media such as non-volatile memory (NVM) or NVM Express (NVMe) storage 555. The storage 555 may be local or distributed.

The distributed sniffing network 515 may include security policies 535 or software development and information technology operations (Dev-Ops) scripts and framework 545. Scripts and other utility programs may be used by the Dev-Ops scripts and framework 545 or by a user to issue instructions, requests, or other commands to the sniffers, such as using input/output (I/O) calls. These may be used to implement, modify, or update sniffers at any of the interfaces within the distributed sniffing framework 525.

While distributed sniffing network 515 shows monitoring at various interfaces between servers, traffic monitoring by sniffers may be implemented at network locations other than where switching or routing occurs. A sniffer may be configured to perform a transformation of packet or message traffic so that the data or header traffic seen by a destination may be different from that seen by the sniffer and any adjacent operation attached to the sniffer. A network control plane may provide for interposition of a sniffer before the destination, such as by interposing a sniffer as a protocol, as content, as an application, as a security proxy, or in another network sniffer implementation.

Figure 6:
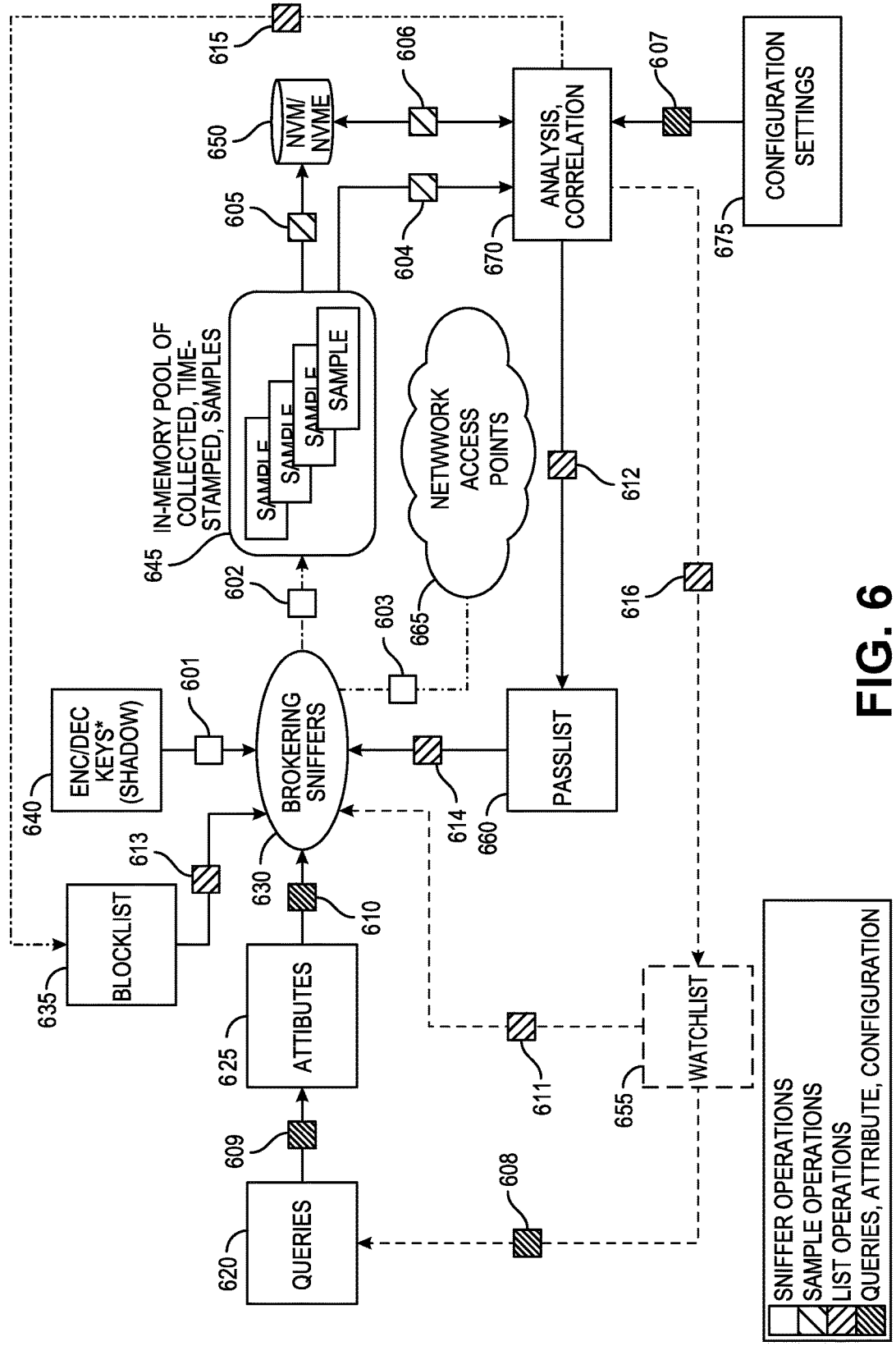
FIG. 6 is a block diagram illustrating a brokering sniffer architecture, according to an embodiment.

FIG. 6 is a block diagram illustrating a brokering sniffer architecture 600, according to an embodiment. Architecture 600 may be used for distributing data collection responsibilities, distributing encryption-decryption responsibilities, and distributing analysis responsibilities. Architecture 600 may be used to for identifying one or more network sources or destinations that are to be placed in passlist, blocklist, or watchlist categories. Architecture 600 may use queries that may be formulated by middleware monitoring services, where attributes of interest may be identified in those queries so that the right subset of traffic is collected for analysis.

Architecture 600 may be based on a distributed arrangement of network traffic sniffers collectively referred to as brokering sniffers 630. The distributed brokering sniffers 630 may be implemented in software, firmware, or hardware. In an example, the distributed brokering sniffers 630 may be implemented as a software agent (e.g., as a part of a network stack), which may include static programs or dynamically reconfigurable software sniffer agents. In another example, the distributed brokering sniffers 630 may be implemented as static hardware sniffers or dynamically reconfigurable hardware sniffer agents, such as on an intelligent network interface controller (NIC) (e.g., smartNIC), a field-programmable gate array (FPGA), a Peripheral Component Interconnect Express (PCI Express) bus, a system-on-a-chip (SOC), an infrastructure processing unit (IPU). The implementation of the distributed brokering sniffers 630 on hardware may provide improved efficiency, such as more efficient inline hardware encryption and encryption. The implementation of the distributed brokering sniffers 630 on hardware may also provide improved security, as finite-state hardware implementations (e.g., SmartNIC, IPU) are not directly accessible by an external network entity, and may reduce or prevent stack fault cyberattacks that may be used to attack a CPU-based stack implementation.

These brokering sniffers 630 may monitor multiple network access points 665. These network access points 665 may include honeypots, network telescopes, firewalls, network intermediaries, hosts of applications, microservices, network lambda functions, or other network access points. The distributed brokering sniffers 630 may be deployed to an initial network location (e.g., based on network access points 665), redeployed to capture traffic from other locations or network devices, or rearranged based on network traffic capture targets.

The brokering sniffers 630 may receive or identify various network operational information, such as combinations of source or destination network addresses. This information may analyzed be forwarded to a distributed blocklist 635, a distributed passlist 660, or a distributed watchlist 655. The blocklist 635 may be used to identify access points that are to be monitored and whose traffic is to be rerouted to honeypots. The passlist 660 may be used to identify access points for which summary information for various performance statistics is to be collected. The watchlist 655 may be used to identify access points that are to be monitored closely, such as by collecting variable amounts of information at a given time.

Information collected from access points is collected, timestamped, and filtered to form a stream of samples 645. The samples 645 may be processed by analysis and correlation programs 670 (e.g., online programs) or may be placed in NVM (e.g., Optane memory) or NVMe storage 650 for near-online or time-bounded frequent processing by a set of analysis and correlation programs 670. The analysis and correlation programs 670 may receive their own static or dynamic configuration settings 675. The configuration settings 675 may indicate what network analysis to perform, what network traffic features to look for, what network actions to initiate for additional levels of monitoring, or other configurations. The configuration settings 675 may be provided via a configuration service API, which may allow changes to the analysis and correlation programs 670, changes to the distributed blocklist 635, distributed passlist 660, or distributed watchlist 655, or changes applied directly to the brokering sniffers 630. Inn example, configuration settings 675 or other settings or commands may be received at brokering sniffers 630, which may add sniffers, remove sniffers, cause existing sniffers to capture specific network packets, or cause other operational changes to the brokering sniffers 630. The configuration settings 675 may be provided by a user, by a network security application, or by configuration and management components of a control plane (e.g., Openstack control plane, K8S control plane).

The analysis and correlation programs 670 may generate results that may be used to update one or more of the blocklist 635, passlist 660, or watchlist 655. This updating of lists based on network traffic analysis provides the ability for the brokering sniffers 630 to alter profiling behaviors dynamically based on a combination of policy inputs and patterns identified by the analysis and correlation programs 670. The distributed brokering sniffers 630 may function as sniffer agents that may be authorized to modify network traffic collection or other settings on behalf of the analysis and correlation programs 670. In an example, a sniffer agent may be tasked with collecting a type of network packet at a network location, and if the sniffer agent determines that the network packet is not being collected within an expected timeframe, the sniffer agent may remove network filters to capture more network traffic. A sniffer agent may generate metadata, which may be added to a packet and used by another sniffer agent or by analysis and correlation programs 670. In various examples, the distributed brokering sniffers 630 may be controlled directly by analysis and correlation programs 670, or may be controlled indirectly as sniffer agents configured to detect network traffic according to metadata from other sniffer agents, according to the analysis and correlation programs 670, or according to the blocklist 635, passlist 660, or watchlist 655. Sniffer agents may be configured to reconfigure network traffic sniffing settings (e.g., network targets, packet targets, filtering, decryption) based on external control (e.g., from analysis and correlation programs 670) or based on internal control, such as based on internal network traffic analytics, internal artificial intelligence (AI) network analysis, or other internal processing of network information.

The brokering sniffers 630 may be managed using secure management technology, such using Active Management Technology (AMT) of the Intel Management Engine (ME) to provide remote, out-of-band management of the distributed brokering sniffers 630. Network housekeeping functionality may be implemented to improve the functionality of the brokering sniffers 630, such as a baseboard management controller (BMC) microcontroller on a server motherboard used to manage an interface between system-management software and platform hardware in an Intelligent Platform Management Interface (IPMI) platform.

The results generated by the analysis and correlation programs 670 may also be used in the formulation of additional queries 620 and in the identification of attributes 625 to be collected for analysis in response to those queries 620. The analysis and correlation programs 670 therefore provide a policy enforcement mechanism that causes the additional queries 620 to be generated. These additional queries 620 may be seen as inter-system requests for specific network metrics, where these additional queries 620 are implemented by brokering sniffer 630 as network traffic sniffers to provide the network metrics requested by the analysis and correlation programs 670. In an example, a query may examine whether or not network traffic indicates a rate of arrival higher than a certain threshold from a particular group of source network addresses. Such a query may be generated based on the analysis and correlation programs 670 detecting that a number of recent abandoned connections from a particular domain to the same destination addresses has exceeded some abandoned connection threshold. The determination of recency (e.g., time window width, initial time) and the abandoned connection threshold may include static or dynamic values that are determined or further modified by the analysis and correlation programs 670, such as in response to recently analyzed network traffic.

The brokering sniffer architecture 600 may include various sniffing operations 601 through 616. These include brokering or filtering points that perform the network monitoring, and the analysis and query formulation middleware that is to control the type of data and network telemetry to be collected at those brokering or filtering points. The sniffing operations may be built into the networking software stack at each networked server and controlled by various parameters. Some parameters may control which network packets or messages are selected for sniffing, while other parameters may control what data is to be analyzed within those packets or messages and what transformations are to be performed as a result of various conditions being met. These parameters may be determined set by various brokers, and the brokers may be local to or remote from the network stacks over which sniffing is performed.

At 603, sniffed packets sent from the network access points 665 to the brokering sniffers 630 may be decrypted selectively. This decryption may be based on whether deep packet inspection is needed to analyze encrypted packet contents. A network packet transformation may also be applied at 603, such as to filter the network packet or generate a compacted packet. After decryption or transformation, these packets may be re-encrypted for blending back into the network flow.

At 602, packets sent from the brokering sniffers 630 to the samples 645 may be decrypted, transformed, or encrypted. These samples may then be collected within samples 645, and then presented as samples to the analysis and correlation programs 670 or for logging within memory storage 650. At 604, samples may be reordered, verified for correctness, decrypted where needed, and indexed or otherwise organized for use in the analysis and correlation programs 670. At 605, a subset of samples may be ordered, transformed for storage, or indexed for quick retrieval before they are stored in memory storage 650. At 606, samples may be accessed based on metadata and retrieved from memory storage 650. The retrieval may be based on key-value and attribute-match searches.

Keys for decrypting or encrypting network packets may be provided at 602 or 603 in the form of wrapped keys. These wrapped keys may be provided to the brokering sniffers 630 at 601. This wrapped key transfer may reduce or eliminate the need to distribute sensitive encryption or decryption secrets at all locations across a network. Instead, the wrapping keys may be sent only to the code that needs to perform the encryption or decryption. By allowing only the trusted elements in 601 to have the capability to generate the underlying keys and apply them to the selected traffic at 602 and 603, the wrapping keys may be distributed freely to the trusted elements in 601.

Network traffic search patterns may be adjusted at one or more of 607, 608, 609, or 610. In an example, these traffic search pattern adjustments may be in response to an increase in an alert level. The alert level may be increased in response to sensitive computations being scheduled, increasing indications of suspicious activity, increasing numbers of anomalous requests, or other network monitoring metrics. The anomalous requests may be determined based on excessive numbers of accesses of cold content (e.g., seldom accessed data) or excessive numbers of abandoned connections.

At 607, the configuration settings 675 may be customized before being provided to the analysis and correlation programs 670. At 608, the types of queries may be adjusted further. At 609, various attributes used in the queries or thresholds to use in triggering collections may be adjusted. At 610, combinations of values and masks may be determined, where the values and masks may be applied to select network packets that match the combinations of values that satisfy a particular query predicate.

At 611, the selection of packets and handling of traffic may be customized according to a current or updated watchlist 655. Similarly, the selection of packets and handling of traffic may be customized at 613 according to a current or updated blocklist 635, and may be customized at 614 according to a current or updated passlist 660. Changes to the passlist 660, blocklist 635, and watchlist 655 may be performed at 612, 615, and 616, respectively. These changes may be in response to an analysis identifying additional sources or destinations to block (e.g., place in the blocklist 635) or to examine closely (e.g., to place in watchlist 655).

Sniffing operations 601 through 616 may be customized based on various timing considerations or statistical analyses, such as to address various types of cyberattacks. Some cyberattacks are sensitive to timing, where if an attacker does not hear back from its target within a narrow range of time, the attacker may assume that the attacker's target is not very responsive and choose to select a different vector of attack. In other cyberattacks, the goal of an attacker may be to reduce availability of a highly available service, such as by saturating that service with spurious requests. To address these cyberattacks, brokering proxy code at 603 or 611 through 616 may implement statistically activated random delays for packets transiting to external addresses. This use of statistically activated random delays may improve the ability of the network to reduce, eliminate, or expose certain types of cyberattacks. At each of sniffing operations 601 through 616, customization of monitoring may include logic for obtaining and filtering both regular telemetry and in-band network telemetry (INT).

The brokering sniffer architecture 600 may implement a statistical framework provide improved network packet collection and analysis. In an example, the statistical framework may be used to generate multiple dynamic queries at a switch or a router such to substantially reduce the number of packets that need to be collected for driving analysis required by those queries. When monitoring network traffic for congestion and attacks, many diverse measurements may need to be performed simultaneously on the network traffic, such as to spot various types of anomalies and counter them as quickly as possible. Performing a high volume of monitoring over heterogeneous types of network packet and message data collections may include substantial memory capacity and access requirements to collect data without slowing down the traffic. A network traffic collection agent (e.g., sniffer agent) may need to collect and analyze a substantial amount of network data. Each network traffic analysis query may be configured to reduce or minimize an amount of computation needed to determine whether or not to collect a packet or batch of packets for additional analysis. As the number of queries increases, this increases the complexity of completing multiple different types of network traffic filtering at each node without causing traffic slowdowns, such as in response to an increase in the amount of data to be collected, stored, and transmitted to analysis points. To reduce or eliminate the need to store and transmit large volume of collected network data, the network may be collected, filtered, and analyzed locally. However, a local implementation may increase the complexity of scaling up analysis, such as due to limits on local memory or local compute resources, or in an effort to avoid causing local congestion due to combining of normal network processing with collection and analysis.

The statistical framework within the brokering sniffer architecture 600 may be used to improve network traffic collection, such as by reducing or eliminating collection of network traffic samples that are likely to be redundant. A distributed denial of service (DDOS) attack may be identified through analysis of the destination address or domain being attacked, where DDOS attack evidence may include identification of multiple requestors that target the same destination in a burst mode (e.g., a significantly higher request rate than an established threshold). A worm attack may be identified through analysis of the source address (e.g., the origin of the worm attack), while the evidence may include multiple requests to send data to distinct destinations at a high rate (e.g., in order to spread the worm attack). A port-scan attack may be identified through analysis of a combination of a source with a destination, while the evidence may include multiple many interactions in which a wide range of distinct ports of the destination are being targeted. A Sasser attack may be identified when two distinct addresses contact a common destination address at a specific network port within a short time interval, while the evidence is in the inter-arrival-time distribution for distinct source addresses within a given interval of observation. The evidence for various attacks may be analyzed and hashed into a segment so that common attacks may map to a common hashed value and redundant hashed values may be discarded. The likelihood (e.g., frequency) of distinctive samples reaching a threshold may be controlled by the number of distinct values in a hashed segment to which independent samples are likely to map. Statistical collection of packet contents (e.g., packet header, packet data) across multiple different queries may be statistically combined and formulated, such as based on the multiple coupon collector problem. Using these statistical techniques, a single packet may be collected for each packet collection criteria. This provides the ability to scale the packet collection with the number of attack types, which may reduce the burden on local computing and memory resources to a constant factor based on the total traffic rate at a given sniffer.

The statistical framework may be implemented on one or more brokering interfaces within the brokering sniffer architecture 600. In an example, the statistical collection techniques may be used at brokering interfaces 608, 609, or 610 to improve the queries 620 or attributes 625. In another example, the brokering interfaces 601 or 602 may be used to provide flexible and distributed decryption of encrypted headers, such as to analyze traffic that has been encrypted by diverse encryption keys. The implementation of the statistical framework within the brokering sniffer architecture 600 may provide improved performance for collection and analysis of network traffic that flows through a multi-tenant data center at multiple ingress or egress points or for network traffic that is divided into multiple subnets. The statistical framework may provide improved performance for queries of interest that are nested and shared across different encryption keys, such as to provide improved detection of a complex attack pattern initially at a coarse analysis level and subsequently at increasingly detailed analysis levels. The statistical framework may also provide improved performance for a complex attack pattern may be discerned at a lower frequency at multiple different monitoring points and recognized as significant by aggregating the statistics. For example, a worm attack may target destinations split across many different subnets, and the statistical framework may use cooperative sharing and aggregating of statistics across different subnets such that the aggregate rate of contact with the source of the worm attack reaches the necessary threshold for the source to be flagged as an attack.

The statistical framework may use hardware-optimized statistical collection. In an example, a Hardware-Assisted LOokup (HALO) may be used to introduce hardware assistance in simplifying the statistical collection of packets. This hardware optimization may use hardware to perform a lookup, such as for a value that is defined as a mapping of a key and optionally one or more attributes. This may provide the ability to perform complex mapping quickly by leveraging hardware lookup implementations in various algorithms, such as in virtual network functions, cryptography, databases, or graph computations. An example hardware lookup query is shown in Table 1:

TABLE 1

| Hardware-Assisted Lookup |
| --- |
| query-match (q):<br>    if ( bit [ $map_1$ (q.key, [q.attributes]) ] == '0') {<br>        /*unique match detected at the mapped bit */<br>        bit [ $map_1$ (q.key, [q.attributes]) ] == '1' ; |

TABLE 1-continued

Hardware-Assisted Lookup

```
    do_collect (the packet) /* "collect the coupon" */
    if (popcnt ( map2(q.key) ) >= map3(q.key))
        signal (threshold-crossing-event(q)) ;
    /* else do nothing further */
}
/* else do nothing further */
```

As used in Table 1, map3 represents a statistical threshold for a particular query q, map2 represents a total bitfield covered by all attributes for the given query q, and map1 represents a bit in the bitfield of map2 that is satisfied by the attributes of a given payload being examined for a decision as to whether or not to collect the packet.

This hardware lookup may provide improved performance for resolving queries, such as queries that are used to determine whether to execute collection of network traffic. In an example, to determine whether a network traffic query has matched at least a threshold number of distinct attributes, three lookups may be used to determine a bitfield, which bit in the bitfield, and which threshold. A given query may further involve a population count (e.g., count of bits set to 1) over a subset of bits, which may include executing a bit count with a mask covering the bitfield. These lookups may need to be performed multiple times per packet, such as one time for each number of queries fielded at a given access point. The efficiency of such a lookup may be improved by implementing the lookup in hardware and in a parallel or pipelined fashion.

Performance may be improved further based on a query selection. In an example, if the same packet qualifies for collection according to more than one query, one of the queries may be selected to satisfy an at-most-1 write criterion. To improve efficiency, a packet may be collected regardless of the criterion, and the packet may be associated with whichever query reaches its respective threshold as a result of the collection of that packet. This may be used to reduce or eliminate the need to transfer control from hardware-based collection to a software-based tie-breaker algorithm.

Figure 7:
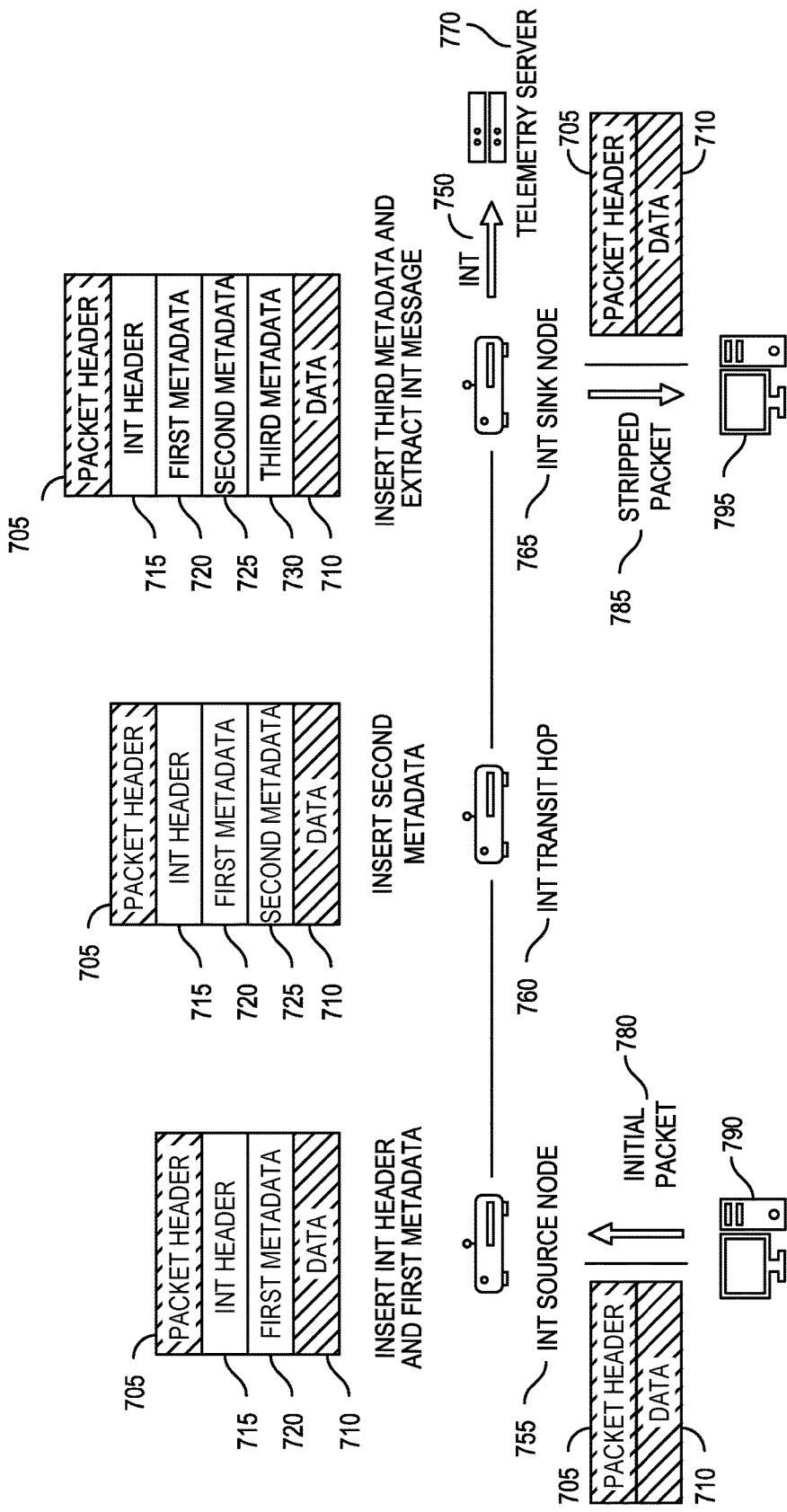
FIG. 7 is a block diagram illustrating brokered sniffing telemetry, according to an embodiment.

FIG. 7 is a block diagram illustrating brokered sniffing telemetry 700, according to an embodiment. The brokering sniffing may benefit from various forms of telemetry. Telemetry may improve generation of payload content queries, and analysis of payload contents may be used to determine what types of telemetry to collect. Security brokering may be used in collecting telemetry across abstracted networks (e.g., software-virtualized networks, software-defined networks). The brokering sniffing may benefit from using one or more of classic network traffic telemetry and in-band network telemetry (INT). Classic traffic telemetry may include measuring bandwidths, latencies, distributions of bandwidths and latencies, numbers of packets dropped, or numbers of packets switched or routed along different alternative routes between the same source and destination.

The brokered sniffing telemetry 700 shows an example implementation of INT for brokered sniffing. At each step, INT nodes may add metadata to collect hop-by-hop statistics or other statistics about packet flows or various nodes. In operation, a first user 790 may send an initial packet 780 to an INT source node 775, where initial packet 780 includes a packet header 705 and data 710. The INT source node 775 may insert an INT header 715 and first metadata 720. The INT source node 775 may send the modified packet to an INT transit hop 760, which may insert second metadata 725.

The INT transit hop 760 may send the modified packet to an INT sink node 765, which may add a third metadata 730. The metadata from these hops may be isolated to generate an INT packet 750 to be sent to a telemetry server 770. The metadata from these hops may also be stripped out from the packet to form a stripped packet 785 to be sent to a second user 795, where the packet header 705 and data 710 in the stripped packet 785 may match the packet header 705 and data 710 in the initial packet 780.

The INT packet 750 may provide information that may be used in brokered sniffing. The INT headers and the metadata that can be added for telemetry collection are not fixed, which provides for customizing the telemetry collected at any point in the network, and for customizing the metadata that can be supplied from any point in the network. The brokered sniffing framework may abstract the INT capability and present it as an API to the network stack and to communicating applications. This use of an API may reduce or eliminate the need for individual applications or network stack implementations to manage collection, analysis, or triggering of any actions based on network traffic analysis.

The brokered sniffing framework may use a combination of INT and classic telemetry collection at the sniffer points to piggyback communication from one sniffing element to another. In an example, when an event of interest transpires at a first network location, then a network traffic sniffer that location may store and transmit information about that event of interest in INT headers or metadata, which may be used by a second network sniffer at a second network location to collect additional and correlated data. This collection and transmission of correlated network traffic data may be used to improve identification of the event of interest.

Figure 8:
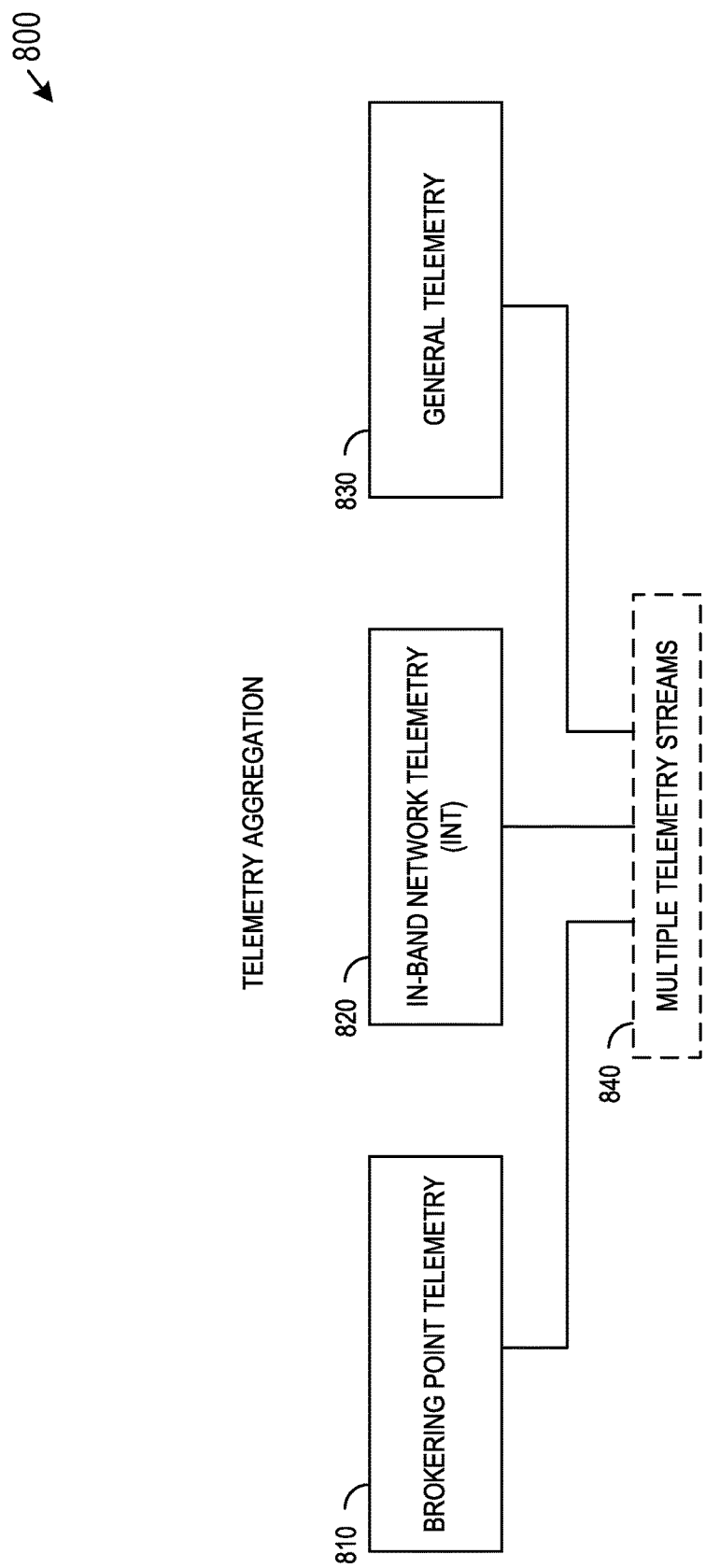
FIG. 8 is a block diagram illustrating telemetry aggregation, according to an embodiment.

FIG. 8 is a block diagram illustrating telemetry aggregation 800, according to an embodiment. Telemetry aggregation 800 may include allocating the brokering point telemetry 810, INT 820, and general telemetry 830 into one or more telemetry streams 840. The brokering point telemetry 810 may include aggregate metrics for network packets, network messages, network traffic queries, and other network attributes satisfying network attribute selection criteria. The INT 820 may include INT metadata, such as described in brokered sniffing telemetry 700. The general telemetry 830 may include bandwidth metrics, network utilization metrics, power consumption metrics, network latency metrics, dropped packet counts, quality of service (QOS) violations, virtual machine (VM) migrations, or other general telemetry data.

The telemetry streams from brokering point telemetry 810, INT 820, and general telemetry 830 may be redistributed by the brokering framework so that telemetry data itself may be used to determine sniffing actions to be performed. In an example, a threshold for statistical collection for detection of a DDOS attack may be varied dynamically as a function of the observed incoming request rate at a server or at a service that is suspected to be the victim (e.g., target) of a DDOS attack. In another example, a threshold may be initially set to a higher threshold value while an incoming request rate is small, and the threshold may be lowered in response to a determination that the request rate or resource utilization rises quickly within a small timeframe.

Figure 9:
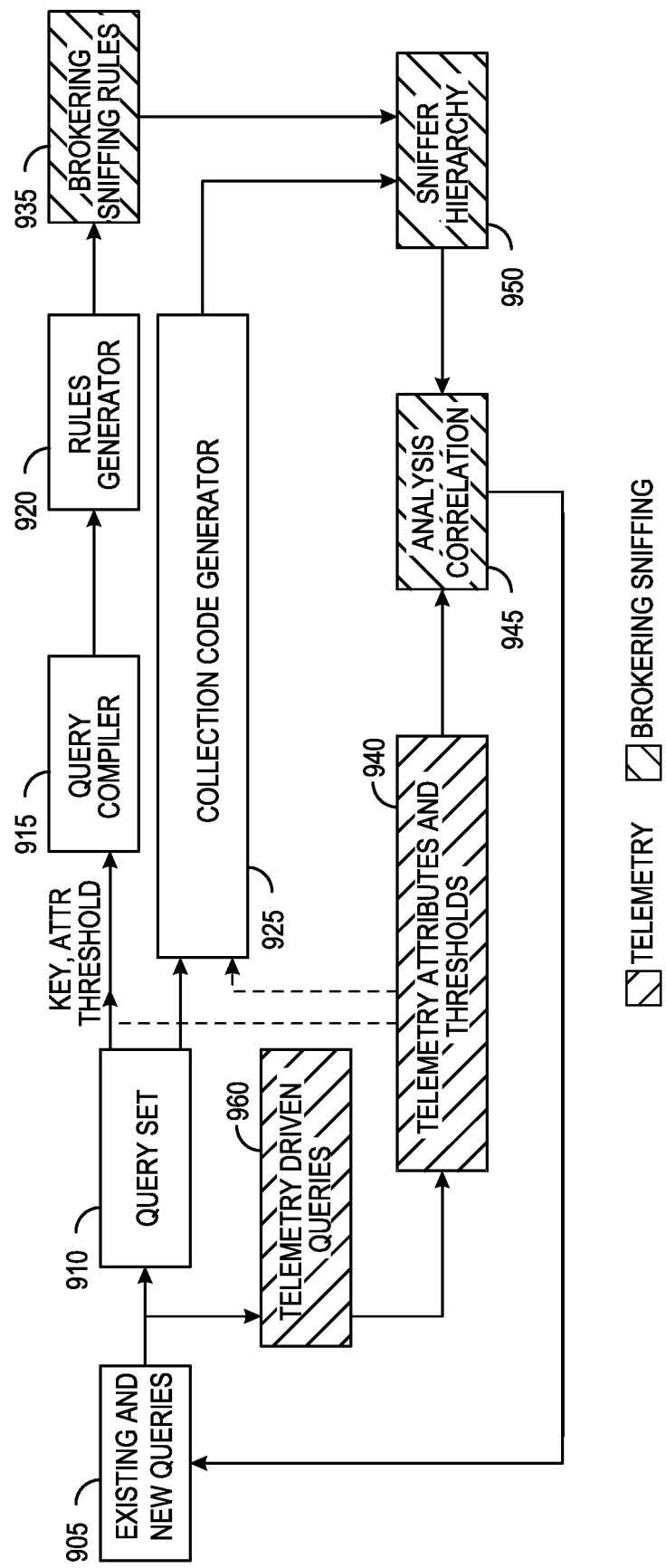
FIG. 9 is a block diagram illustrating a combined brokering sniffing architecture, according to an embodiment.

FIG. 9 is a block diagram illustrating a combined brokering sniffing architecture 900, according to an embodiment. Architecture 900 shows an example combination of the brokering sniffer architecture 600, brokered sniffing telemetry 700, and telemetry aggregation 800. A set of existing and new queries 905 may be combined to form a query set 910, which may be compiled in a query compiler 915. The query compiler 915 may provide a compiled query set to a rules generator 920, which may be used to generate brokering sniffing rules 935, determine a sniffer hierarchy 950 (e.g., sniffer architecture), and generate new queries using analysis and correlation programs 945. The analysis and correlation programs 945 may perform one or more of the operations described with analysis and correlation programs 670 within brokering sniffer architecture 600 in FIG. 6.

The set of existing and new queries 905 may be used to generate telemetry driven queries 960 and telemetry attributes and thresholds 940, such as using brokered sniffing telemetry 700 and telemetry aggregation 800. The telemetry attributes and thresholds 940 may be combined with the query set to generate an improved set of queries for compilation within the query compiler 915, or to feed directions to a network traffic collection code generator 925. The network traffic collection code generator 925 may be used to generate code for network traffic collection, such as static code that may be used to collect network traffic based on protocol and packet header format. The code generated by the network traffic collection code generator 925 may be used to determine a sniffer hierarchy 950. The sniffer hierarchy 950 and the telemetry attributes and thresholds 940 may be used to generate or adjust existing and new queries 905, such as to provide improved network traffic sniffing based on previous network activity.

Figure 10:
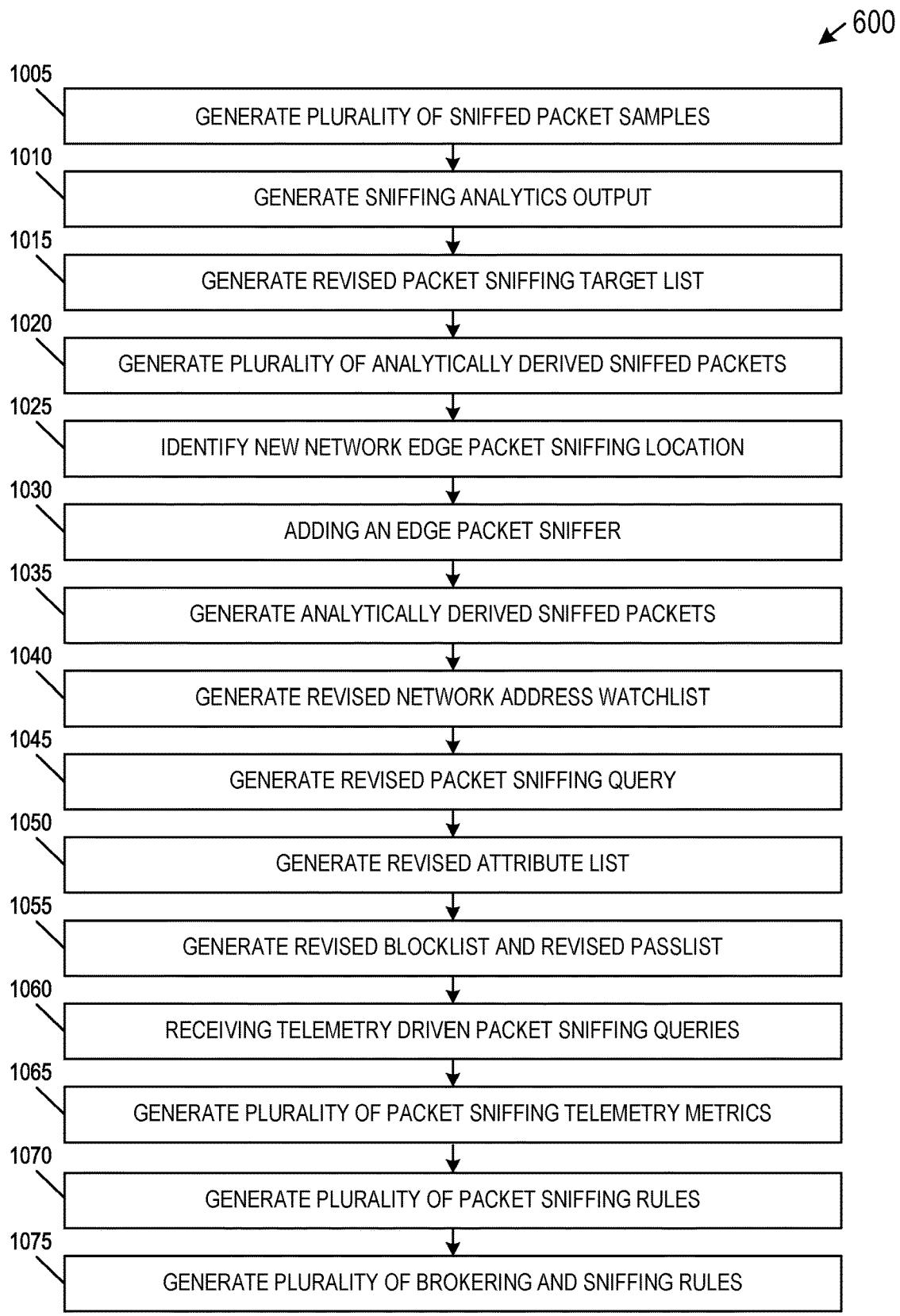
FIG. 10 is a flow diagram illustrating a method for edge computing infrastructure threat analysis, according to an embodiment.

FIG. 10 is a flow diagram illustrating a method 1000 for edge computing infrastructure threat analysis, according to an embodiment. Method 1000 includes generating 1005 a plurality of sniffed packet samples at a plurality of brokering packet sniffers, generating 1010 a sniffing analytics output at a packet sniffing analytics device based on the plurality of sniffed packet samples, generating 1015 a revised packet sniffing target list based on the sniffing analytics output, and generating 1020 a plurality of analytically derived sniffed packets at the plurality of brokering packet sniffers based on the revised packet sniffing target list.

Method 1000 may further include identifying 1025 a new network edge packet sniffing location with an edge computing infrastructure, adding 1030 an edge packet sniffer at the new network edge packet sniffing location to the plurality of brokering packet sniffers, and generating 1035 at least a portion of the plurality of analytically derived sniffed packets from the new network edge packet sniffing location.

Method 1000 may further include generating 1040 a revised network address watchlist at the packet sniffing analytics device based on the plurality of sniffed packet samples. The generation of the plurality of analytically derived sniffed packets at the plurality of brokering packet sniffers may be further based on the revised network address watchlist.

Method 1000 may further include generating 1045 a revised packet sniffing query based on the revised network address watchlist and generating 1050 a revised attribute list based on the revised packet sniffing query. The generation of the plurality of analytically derived sniffed packets at the plurality of brokering packet sniffers may be further based on the revised attribute list.

Method 1000 may further include generating 1055 a revised blocklist and a revised passlist at the packet sniffing analytics device based on the plurality of sniffed packet samples. The generation of the plurality of analytically derived sniffed packets at the plurality of brokering packet sniffers may be further based on the revised blocklist and the revised passlist.

Method 1000 may further include receiving 1060 telemetry driven packet sniffing queries and generating 1065 a plurality of packet sniffing telemetry metrics based on the telemetry driven packet sniffing queries. The generation of the sniffing analytics output may be further based on the plurality of packet sniffing telemetry metrics.

Method 1000 may further include generating 1070 a plurality of packet sniffing rules based on an initial query set and generating 1075 a plurality of brokering and sniffing rules based on the plurality of packet sniffing rules. The plurality of sniffed packet samples may be generated based on the plurality of brokering and sniffing rules.

Figure 11A:
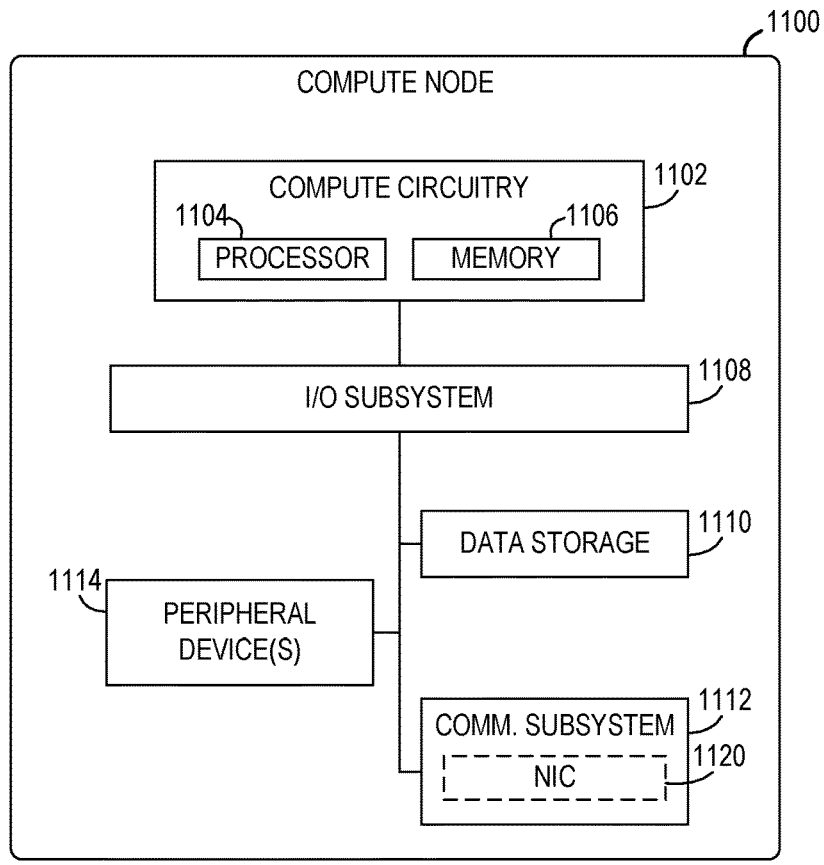
FIGS. 11A and 11B provide an overview of example components within a computing device in an edge computing system, according to an embodiment.
Figure 11B:
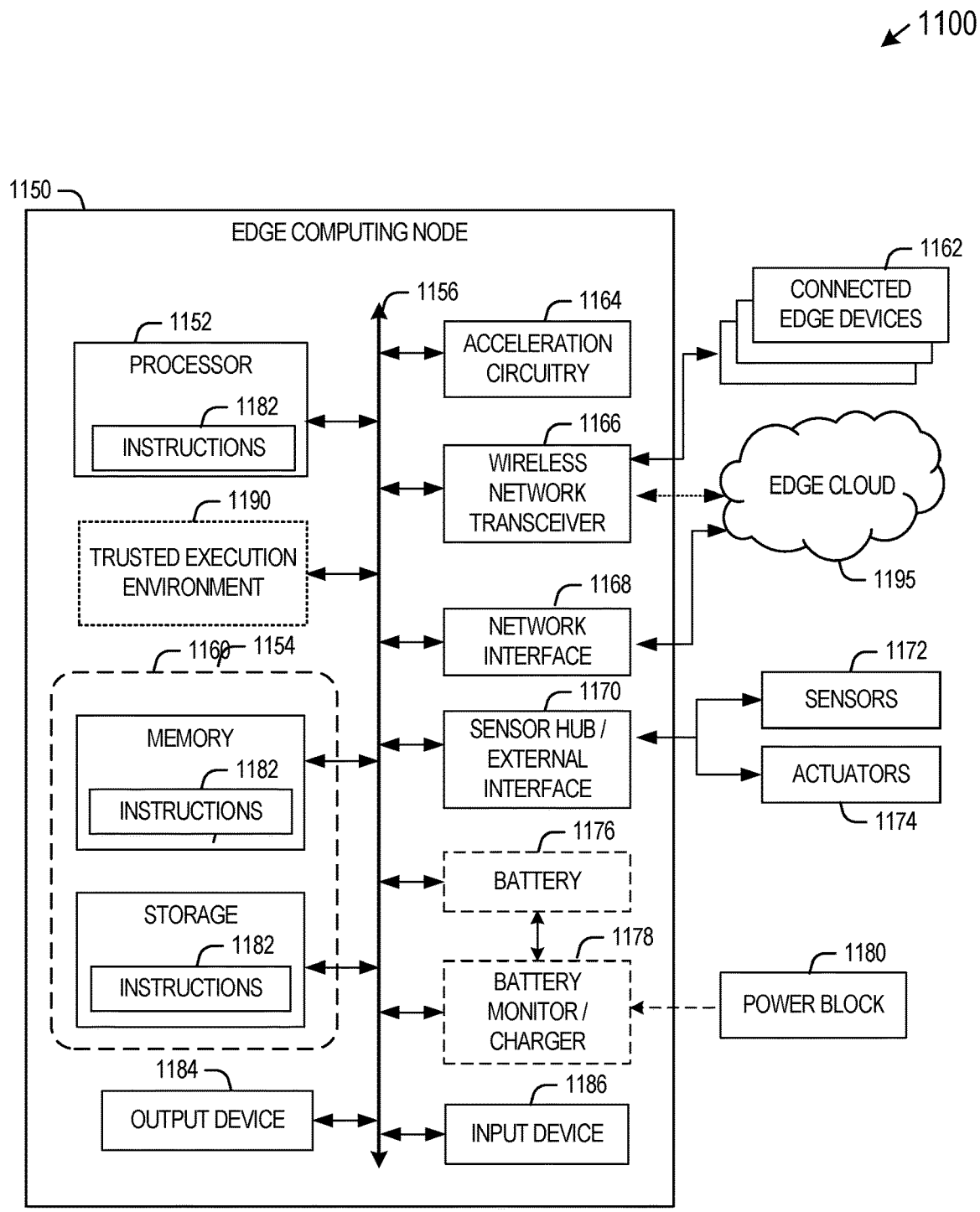

FIGS. 11A and 11B provide an overview of example components within a computing device in an edge computing system 1100, according to an embodiment. In further examples, any of the compute nodes or devices discussed with reference to the present edge computing systems and environment may be fulfilled based on the components depicted in FIGS. 11A and 11B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 11A, an edge compute node 1100 includes a compute engine (also referred to herein as "compute circuitry") 1102, an input/output (I/O) subsystem 1108 (also referred to herein as "I/O circuitry"), data storage 1110 (also referred to herein as "data storage circuitry"), a communication circuitry subsystem 1112, and, optionally, one or more peripheral devices 1114 (also referred to herein as "peripheral device circuitry"). In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 (also referred to herein as "processor circuitry") and a memory 1106 (also referred to herein as "memory circuitry"). The processor 1104 may be embodied as any type of processor capable of performing the functions described herein (e.g., executing an application). For example, the processor 1104 may be embodied as a multi-core processor(s), a microcontroller, a processing unit, a specialized or special purpose processing unit, or other processor or processing/controlling circuit.

In some examples, the processor 1104 may be embodied as, include, or be coupled to an FPGA, an application specific integrated circuit (ASIC), reconfigurable hardware or hardware circuitry, or other specialized hardware to facilitate performance of the functions described herein. In some examples, the processor 1104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing, or managing server or data center hardware, managing service meshes, or collecting and distributing telemetry), outside of the CPU or general-purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 1106 may be integrated into the processor 1104. The memory 1106 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0," set to logical "1," set to an intermediary resistance value) are accomplished by applying one or more current pulses to the at least two electrodes, in which the pulses have a particular current magnitude and duration. For instance, a long low current pulse (SET) applied to the at least two electrodes may cause the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 1102 is communicatively coupled to other components of the compute node 1100 via the I/O subsystem 1108, which may be embodied as circuitry and/or components to facilitate input/output operations with the compute circuitry 1102 (e.g., with the processor 1104 and/or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1108 may form a portion of a system-on-a-chip (SoC) and be incorporated, along with one or more of the processor 1104, the memory 1106, and other components of the compute circuitry 1102, into the compute circuitry 1102.

The one or more illustrative data storage devices/disks 1110 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 1110 may include a system partition that stores data and firmware code for the data storage device/disk 1110. Individual data storage devices/disks 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway of an implementing edge computing system). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node). In some examples, the NIC 1120 may be embodied as part of a system-on-a-chip (SoC) that includes one or more processors, or included on a multichip package that also contains one or more processors. In some examples, the NIC 1120 may include a local processor (not shown) and/or a local memory (not shown) that are both local to the NIC 1120. In such examples, the local processor of the NIC 1120 may be capable of performing one or more of the functions of the compute circuitry 1102 described herein. Additionally, or alternatively, in such examples, the local memory of the NIC 1120 may be integrated into one or more components of the client compute node at the board level, socket level, chip level, and/or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, and/or other peripheral devices, depending on the particular type of the compute node 1100. In further examples, the compute node 1100 may be embodied by a respective edge compute node (whether a client, gateway, or aggregation node) in an edge computing system or like forms of appliances, computers, subsystems, circuitry, or other components.

In a more detailed example, FIG. 11B illustrates a block diagram of an example of components that may be present in an edge computing node 1150 for implementing the techniques (e.g., operations, processes, methods, and methodologies) described herein. This edge computing node 1150 provides a closer view of the respective components of node 1100 when implemented as or as part of a computing device (e.g., as a mobile device, a base station, server, gateway, etc.). The edge computing node 1150 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1150, or as components otherwise incorporated within a chassis of a larger system.

The edge computing device 1150 may include processing circuitry in the form of a processor 1152, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation, Santa Clara, California. As an example, the processor 1152 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1152 and accompanying circuitry may be provided in a single socket form factor, multiple socket form factor, or a variety of other formats, including in limited hardware configurations or configurations that include fewer than all elements shown in FIG. 11B.

The processor 1152 may communicate with a system memory 1154 over an interconnect 1156 (e.g., a bus). Any number of memory devices may be used to provide for a given amount of system memory. As examples, the memory 1154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid-state disk drive (SSDD). Other devices that may be used for the storage 1158 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1156 may couple the processor 1152 to a transceiver 1166, for communications with the connected edge devices 1162. The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on Bluetooth Low Energy (BLE), or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in a cloud (e.g., an edge cloud 1195) via local or wide area network protocols. The wireless network transceiver 1166 may be a low-power wide-area (LPWA) transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1168 may be included to provide a wired communication to nodes of the edge cloud 1195 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global navigation system (e.g., GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1150. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the edge computing node 1150, although, in examples in which the edge computing node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the Edge computing node 1150. The processor 1152 may access the non-transitory, machine-readable medium 1160 over the interconnect 1156. For instance, the non-transitory, machine-readable medium 1160 may be embodied by devices described for the storage 1158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 1182 on the processor 1152 (separately, or in combination with the instructions 1182 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 12:
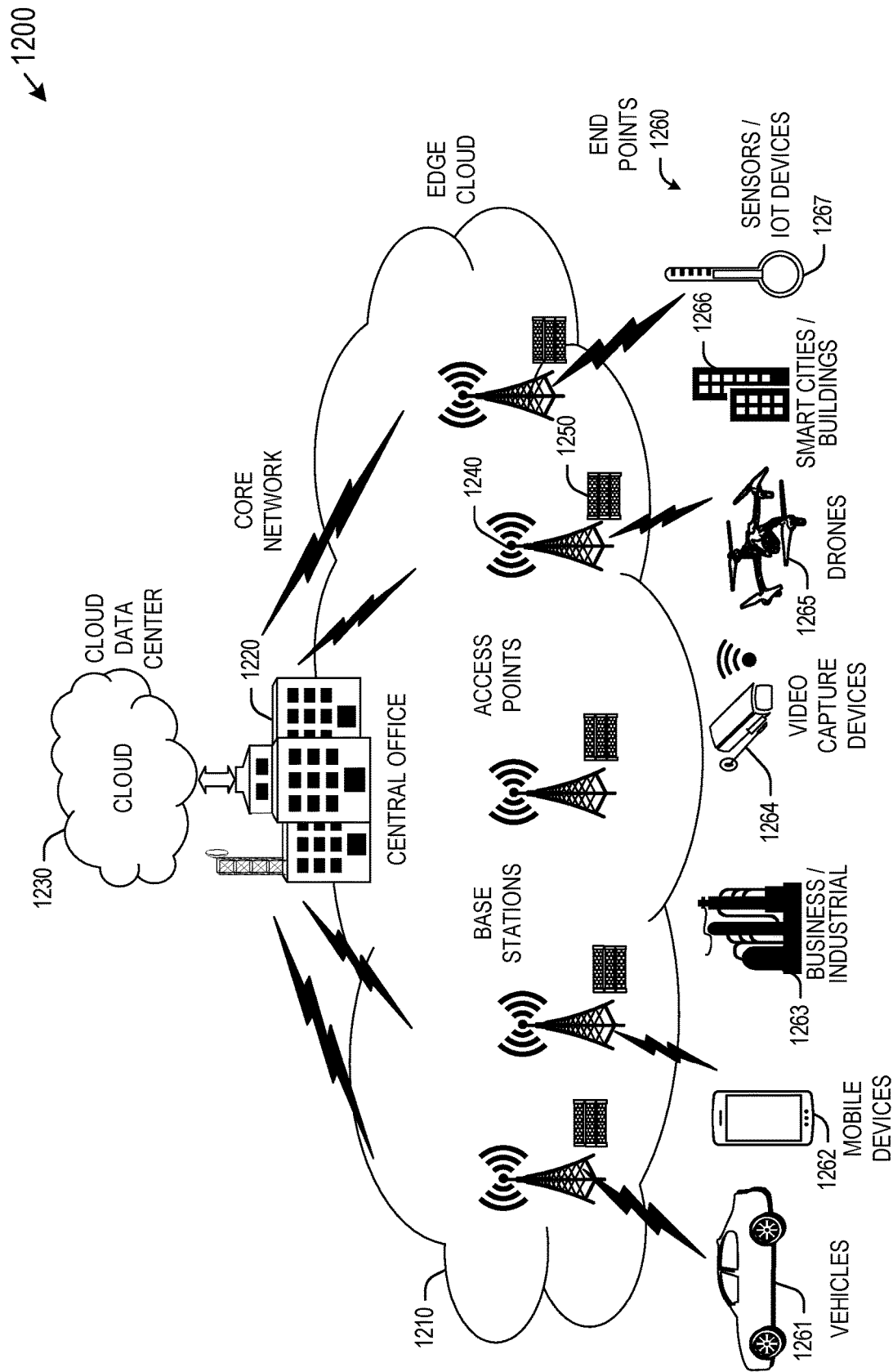
FIG. 12 is a block diagram showing an overview of a configuration for Edge computing, according to an embodiment.

FIG. 12 is a block diagram showing an overview of a configuration for Edge computing, which includes a layer of processing referred to in many of the following examples as an "Edge cloud." As shown, the Edge cloud 1210 is co-located at an Edge location, such as an access point or base station 1240, a local processing hub 1250, or a central office 1220, and thus may include multiple entities, devices, and equipment instances. The Edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities and building devices 1266, sensors and IoT devices 1267, etc.) than the cloud data center 1230. Compute, memory, and storage resources which are offered at the edges in the Edge cloud 1210 are critical to providing ultra-low latency response times for services and functions used by the endpoint data sources 1260 as well as reduce network backhaul traffic from the Edge cloud 1210 toward cloud data center 1230 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce an amount or number of resources needed for network services, through the distribution of more resources which are located closer both geographically and in network access time. In this manner, Edge computing attempts to bring the compute resources to the workload data where appropriate or bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge," "close Edge," "local Edge," "middle Edge," or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 13:
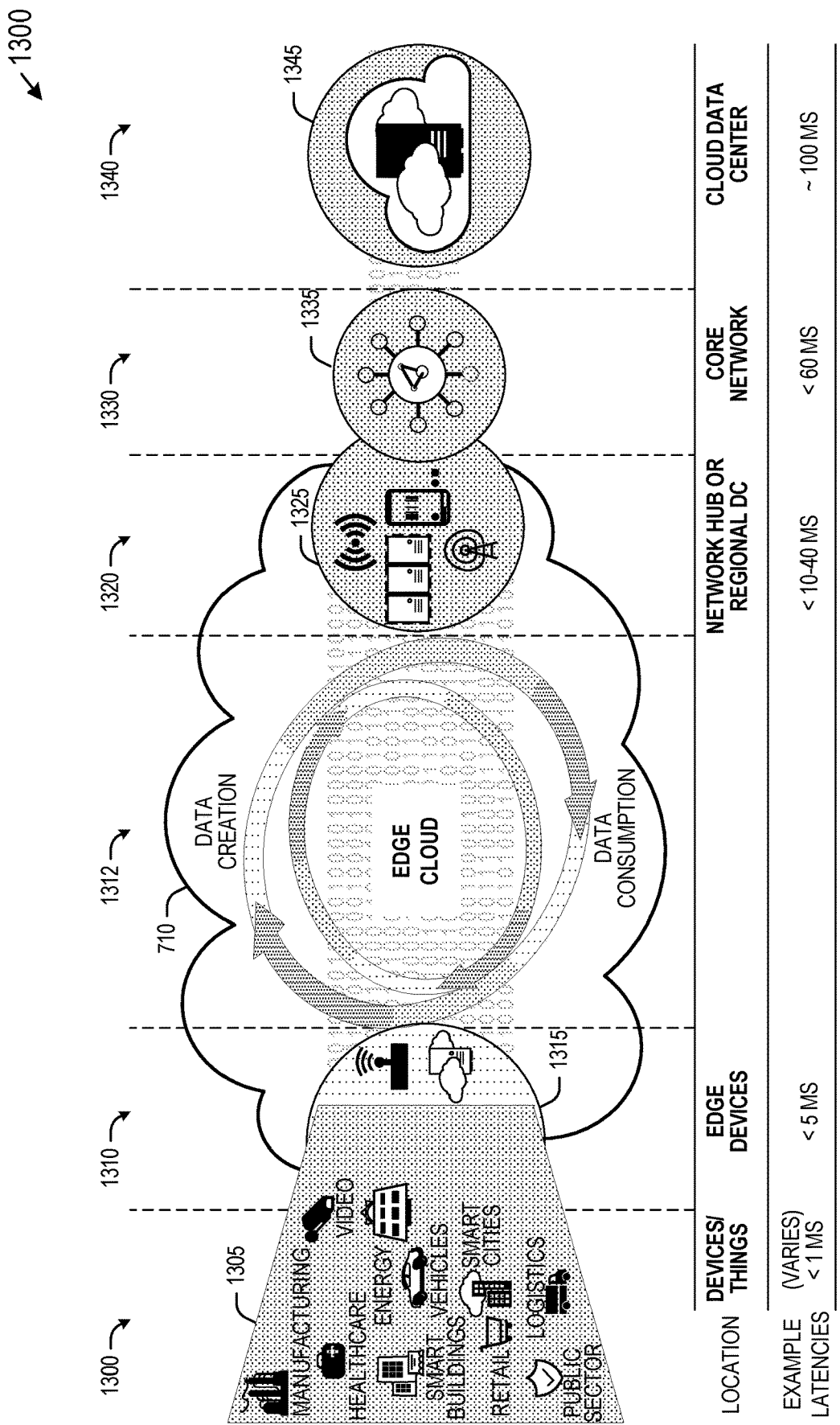
FIG. 13 illustrates operational layers among endpoints, an Edge cloud, and cloud computing environments, according to an embodiment.

FIG. 13 illustrates operational layers among endpoints, an Edge cloud, and cloud computing environments 1300, according to an embodiment. Specifically, FIG. 13 depicts examples of computational use cases 1305, utilizing the Edge cloud 1210 among multiple illustrative layers of network computing. The layers begin at an endpoint (devices and things) layer 1300, which accesses the Edge cloud 1210 to conduct data creation, analysis, and data consumption activities. The Edge cloud 1210 may span multiple network layers, such as an Edge devices layer 1310 having gateways, on-premise servers, or network equipment (nodes 1315) located in physically proximate Edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the Edge cloud 1210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1300, under 5 ms at the Edge devices layer 1310, to even between 10 to 40 ms when communicating with nodes at the network access layer 1320. Beyond the Edge cloud 1210 are core network 1330 and cloud data center 1340 layers, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values are provided for purposes of illustration and contrast; it will be understood that the use of other access network mediums and technologies may further reduce the latencies. In some examples, respective portions of the network may be categorized as "close Edge," "local Edge," "near Edge," "middle Edge," or "far Edge" layers, relative to a network source and destination. For instance, from the perspective of the core network data center 1335 or a cloud data center 1345, a central office or content data network may be considered as being located within a "near Edge" layer ("near" to the cloud, having high latency values when communicating with the devices and endpoints of the use cases 1305), whereas an access point, base station, on-premise server, or network gateway may be considered as located within a "far Edge" layer ("far" from the cloud, having low latency values when communicating with the devices and endpoints of the use cases 1305). It will be understood that other categorizations of a particular network layer as constituting a "close," "local," "near," "middle," or "far" Edge may be based on latency, distance, number of network hops, or other measurable characteristics, as measured from a source in any of the network layers 1300 through 1340.

The various use cases 1305 may access resources under usage pressure from incoming streams, due to multiple services utilizing the Edge cloud. To achieve results with low latency, the services executed within the Edge cloud 1210 balance varying requirements in terms of: (a) Priority (throughput or latency) and Quality of Service (QOS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 1210 (network layers 1300 through 1340), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco," or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 1210.

As such, the Edge cloud 1210 is formed from network components and functional features operated by and within Edge gateway nodes, Edge aggregation nodes, or other Edge compute nodes among network layers 1310 through 1330. The Edge cloud 1210 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 1210 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 1210 may be servers, multi-tenant servers, appliance computing devices, and/or any other type of computing devices. For example, the Edge cloud 1210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11B. The Edge cloud 1210 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 14:
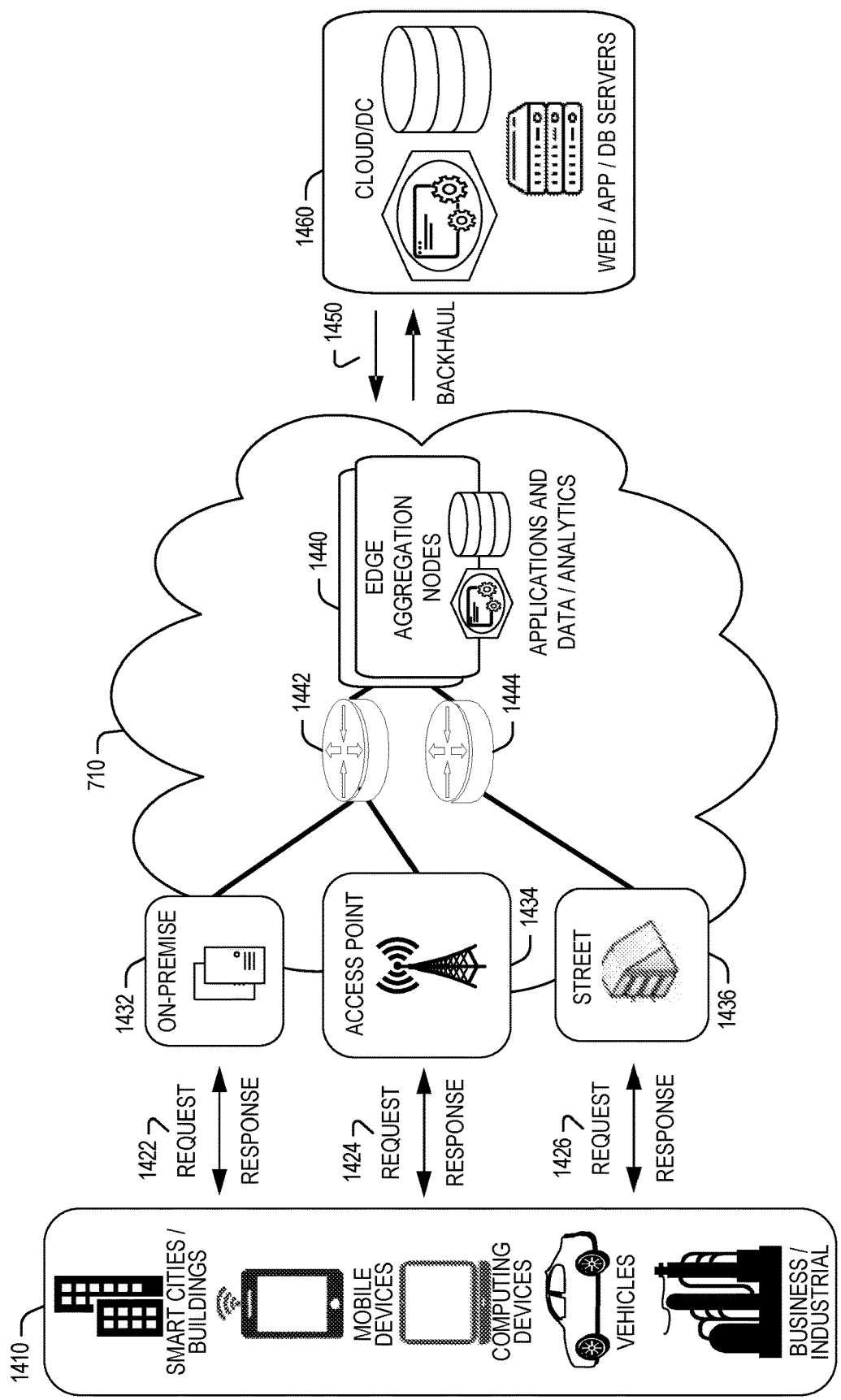
FIG. 14 illustrates an example approach for networking and services in an Edge computing system, according to an embodiment.

FIG. 14 illustrates an example approach for networking and services in an Edge computing system, according to an embodiment. In FIG. 14, various client endpoints 1410 (in the form of mobile devices, computers, autonomous vehicles, business computing equipment, industrial processing equipment) exchange requests and responses that are specific to the type of endpoint network aggregation. For instance, client endpoints 1410 may obtain network access via a wired broadband network, by exchanging requests and responses 1422 through an on-premises network system 1432. Some client endpoints 1410, such as mobile computing devices, may obtain network access via a wireless broadband network, by exchanging requests and responses 1424 through an access point (e.g., cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the Edge cloud 1210 to aggregate traffic and requests. Thus, within the Edge cloud 1210, the TSP may deploy various compute and storage resources, such as at Edge aggregation nodes 1440, to provide requested content. The Edge aggregation nodes 1440 and other systems of the Edge cloud 1210 are connected to a cloud or data center 1460, which uses a backhaul network 1450 to fulfill higher-latency requests from a cloud/data center for websites, applications, database servers, etc. Additional or consolidated instances of the Edge aggregation nodes 1440 and the aggregation points 1442, 1444, including those deployed on a single server framework, may also be present within the Edge cloud 1210 or other areas of the TSP infrastructure.

Figure 15:
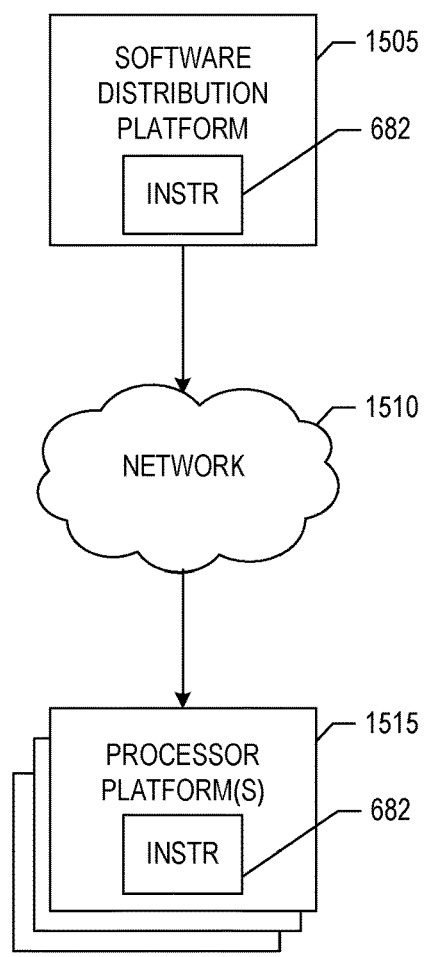
FIG. 15 illustrates an example software distribution platform to distribute software, according to an embodiment.

FIG. 15 illustrates an example software distribution platform 1505 to distribute software, according to an embodiment. The software distribution platform 1505 may include the example computer readable instructions 1182 of FIG. 11, to one or more devices, such as example processor platform (s) 1515 and/or example connected Edge devices 1310 of FIG. 13. The example software distribution platform 1505 may be implemented by any computer server, data facility, cloud service, etc., capable of storing and transmitting software to other computing devices (e.g., third parties, the example connected Edge devices 1310 of FIG. 13). Example connected Edge devices may be customers, clients, managing devices (e.g., servers), third parties (e.g., customers of an entity owning and/or operating the software distribution platform 1505). Example connected Edge devices may operate in commercial and/or home automation environments. In some examples, a third party is a developer, a seller, and/or a licensor of software such as the example computer readable instructions 1182 of FIG. 11. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 15, the software distribution platform 1505 includes one or more servers and one or more storage devices. The storage devices store the computer readable instructions 1182, which may correspond to the example computer readable instructions 1182 of FIG. 11, as described above. The one or more servers of the example software distribution platform 1505 are in communication with a network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 1182 from the software distribution platform 1505. For example, the software, which may correspond to the example computer readable instructions 1182 of FIG. 11 may be downloaded to the example processor platform(s) 1515 (e.g., example connected Edge devices), which is/are to execute the computer readable instructions 1182 to implement one or more of the methods or systems described herein. In some examples, one or more servers of the software distribution platform 1505 are communicatively connected to one or more security domains and/or security devices through which requests and transmissions of the example computer readable instructions 1182 must pass. In some examples, one or more servers of the software distribution platform 1505 periodically offer, transmit, and/or force updates to the software (e.g., the example computer readable instructions 1182 of FIG. 11) to ensure improvements, patches, updates, etc., are distributed and applied to the software at the end user devices.

In the illustrated example of FIG. 15, the computer readable instructions 1182 are stored on storage devices of the software distribution platform 1505 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1182 stored in the software distribution platform 1505 are in a first format when transmitted to the example processor platform(s) 1515. In some examples, the first format is an executable binary in which particular types of the processor platform(s) 1515 can execute. However, in some examples, the first format is uncompiled code that requires one or more preparation tasks to transform the first format to a second format to enable execution on the example processor platform(s) 1515. For instance, the receiving processor platform(s) 1515 may need to compile the computer readable instructions 1182 in the first format to generate executable code in a second format that is capable of being executed on the processor platform(s) 1515. In still other examples, the first format is interpreted code that, upon reaching the processor platform(s) 1515, is interpreted by an interpreter to facilitate execution of instructions.

Figure 16:
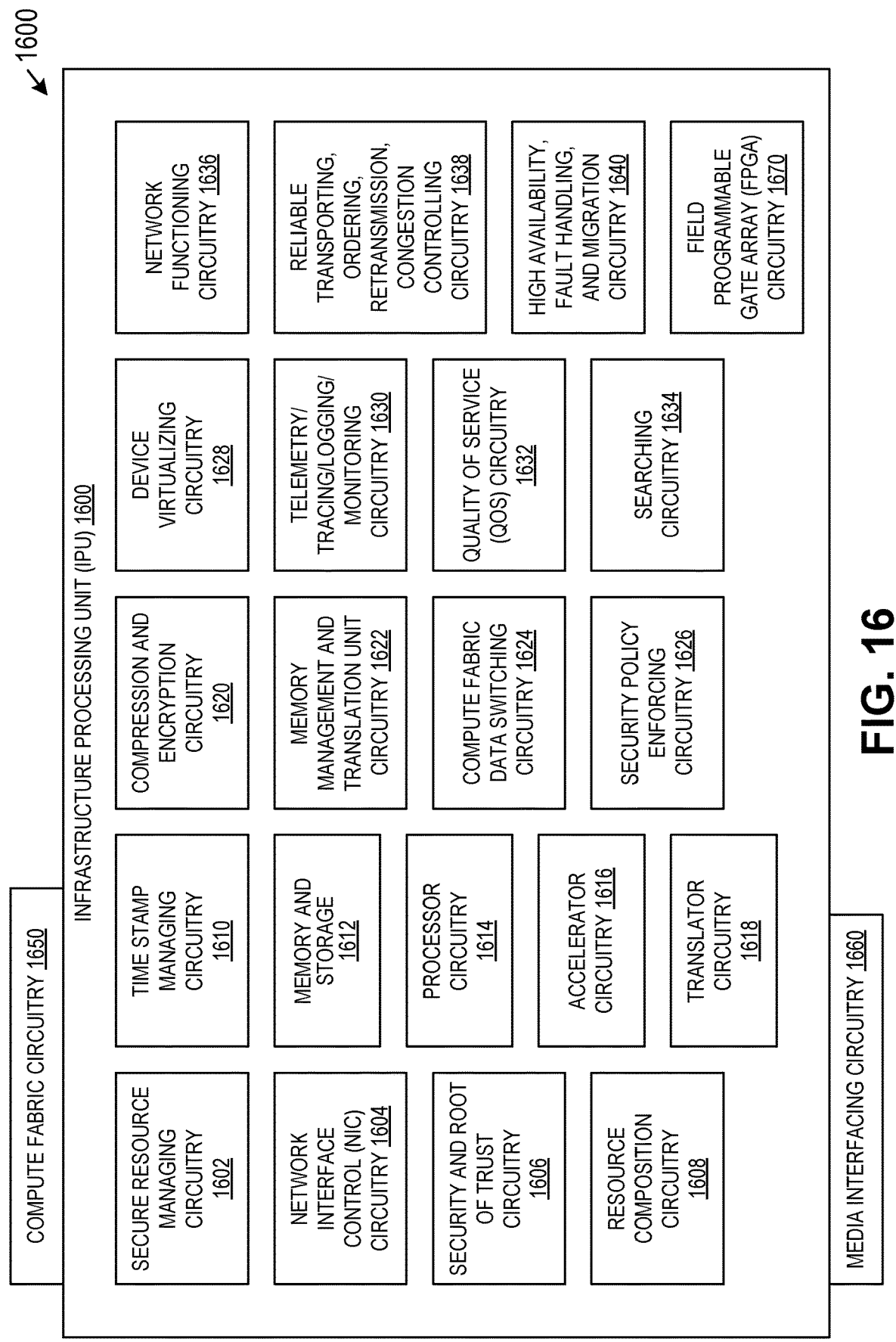
FIG. 16 depicts an example of an infrastructure processing unit (IPU), according to an embodiment.

FIG. 16 depicts an example of an infrastructure processing unit (IPU) 1600, according to an embodiment. Different examples of IPUs disclosed herein enable improved performance, management, security and coordination functions between entities (e.g., cloud service providers), and enable infrastructure offload or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QOS), security, telemetry measurement, event logging, initiating and managing data flows, data placement, or job scheduling of resources on an xPU, storage, memory, or CPU.

In the illustrated example of FIG. 16, the IPU 1600 includes or otherwise accesses secure resource managing circuitry 1602, network interface controller (NIC) circuitry 1604, security and root of trust circuitry 1606, resource composition circuitry 1608, time stamp managing circuitry 1610, memory and storage 1612, processing circuitry 1614, accelerator circuitry 1616, or translator circuitry 1618. Any number or combination of other structure(s) can be used such as but not limited to compression and encryption circuitry 1620, memory management and translation unit circuitry 1622, compute fabric data switching circuitry 1624, security policy enforcing circuitry 1626, device virtualizing circuitry 1628, telemetry, tracing, logging and monitoring circuitry 1630, quality of service circuitry 1632, searching circuitry 1634, network functioning circuitry (e.g., routing, firewall, load balancing, network address translating (NAT), etc.) 1636, reliable transporting, ordering, retransmission, congestion controlling circuitry 1638, and high availability, fault handling and migration circuitry 1640 shown in FIG. 16. Different examples can use one or more structures (components) of the example IPU 1600 together or separately. For example, compression and encryption circuitry 1620 can be used as a separate service or chained as part of a data flow with vSwitch and packet encryption.

In some examples, IPU 1600 includes a field programmable gate array (FPGA) 1670 structured to receive commands from an CPU, XPU, or application via an API and perform commands/tasks on behalf of the CPU, including workload management and offload or accelerator operations. The illustrated example of FIG. 16 may include any number of FPGAs configured or otherwise structured to perform any operations of any IPU described herein.

Example compute fabric circuitry 1650 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 1660 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1600, IPU 1600 is a root of a system (e.g., rack of servers or data center) and manages compute resources (e.g., CPU, xPU, storage, memory, other IPUs, and so forth) in the IPU 1600 and outside of the IPU 1600. Different operations of an IPU are described below.

In some examples, the IPU 1600 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 1600 is selected to perform a workload, secure resource managing circuitry 1602 offloads work to a CPU, xPU, or other device and the IPU 1600 accelerates connectivity of distributed runtimes, reduce latency, CPU and increases reliability.

In some examples, secure resource managing circuitry 1602 runs a service mesh to decide what resource is to execute workload, and provide for L7 (application layer) and remote procedure call (RPC) traffic to bypass kernel altogether so that a user space application can communicate directly with the example IPU 1600 (e.g., IPU 1600 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to iSCSI, NVMe-OF, or CXL.

In some cases, the example IPU 1600 dynamically selects itself to run a given workload (e.g., microservice) within a composable infrastructure including an IPU, xPU, CPU, storage, memory, and other devices in a node.

In some examples, communications transit through media interfacing circuitry 1660 of the example IPU 1600 through a NIC/smartNIC (for cross node communications) or loopback back to a local service on the same host. Communications through the example media interfacing circuitry 1660 of the example IPU 1600 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 1600 prioritizes its processing to minimize the stalling of the requesting application. In some examples, the IPU 1600 schedules the prioritized message request issuing the event to execute a SQL query database and the example IPU constructs microservices that issue SQL queries and the queries are sent to the appropriate devices or services.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Example 1 is a system for edge computing infrastructure threat analysis, the system comprising: a plurality of brokering packet sniffers within an edge computing network configured to generate a plurality of sniffed packet samples; and a packet sniffing analytics device configured to: generate a sniffing analytics output based on the plurality of sniffed packet samples; and generate a revised packet sniffing target list based on the sniffing analytics output; generate a packet sniffing instruction based on the revised packet sniffing target list; wherein the plurality of brokering packet sniffers is further configured to generate a plurality of analytically derived sniffed packets at the plurality of brokering packet sniffers based on the packet sniffing instruction.

In Example 2, the subject matter of Example 1 includes, wherein the plurality of brokering packet sniffers includes a plurality of network sniffer agents configured to: implement an initial sniffer configuration based on packet sniffing instruction; determine a target within the revised packet sniffing target list is not captured within the plurality of analytically derived sniffed packets; and implement a revised sniffer configuration based on the revised packet sniffing target list.

In Example 3, the subject matter of Examples 1-2 includes, wherein the plurality of brokering packet sniffers includes at least one of an intelligent network interface controller (NIC) sniffer, a field-programmable gate array (FPGA) sniffer, a Peripheral Component Interconnect Express bus sniffer, a system-on-a-chip (SOC) sniffer, or an infrastructure processing unit (IPU) sniffer.

In Example 4, the subject matter of Examples 1-3 includes, wherein the packet sniffing instruction includes a statistical packet collection framework, the statistical packet collection framework to instruct a packet sniffer to collect one copy of a target packet and a count of the target packet.

In Example 5, the subject matter of Example 4 includes, the statistical packet collection framework further to instruct the packet sniffer to generate a network packet hash table, the network packet hash table mapping a plurality of redundant packets through a packet hash function to a single hash value corresponding to the target packet.

In Example 6, the subject matter of Examples 1-5 includes, the packet sniffing analytics device further configured to: identify an analytically derived network edge packet sniffing location with an edge computing infrastructure; and deploy an edge packet sniffer at the analytically derived network edge packet sniffing location, the edge packet sniffer forming a part of the plurality of brokering packet sniffers; wherein a portion of the plurality of analytically derived sniffed packets is generated at the analytically derived network edge packet sniffing location.

In Example 7, the subject matter of Examples 1-6 includes, the packet sniffing analytics device further configured to generate a revised network address watchlist based on the plurality of sniffed packet samples, wherein the plurality of analytically derived sniffed packets is further based on the revised network address watchlist.

In Example 8, the subject matter of Example 7 includes, a query generation device configured to: generate a revised packet sniffing query based on the revised network address watchlist; and generate a revised attribute list based on the revised packet sniffing query; wherein the plurality of analytically derived sniffed packets is further based on the revised attribute list.

In Example 9, the subject matter of Example 8 includes, the packet sniffing analytics device further to determine that a number of abandoned connections from a source address transgresses an abandoned connection threshold, wherein the revised packet sniffing query includes a traffic arrival rate query to determine whether a network traffic rate transgresses a traffic rate threshold.

In Example 10, the subject matter of Examples 7-9 includes, the packet sniffing analytics device is further configured to generate a revised blocklist and a revised passlist at the packet sniffing analytics device based on the plurality of sniffed packet samples, wherein the plurality of analytically derived sniffed packets is further based on the revised blocklist and the revised passlist.

In Example 11, the subject matter of Examples 1-10 includes, a telemetry device configured to: receive telemetry driven packet sniffing queries; and generating a plurality of packet sniffing telemetry metrics based on the telemetry driven packet sniffing queries; wherein the sniffing analytics output is further based on the plurality of packet sniffing telemetry metrics.

In Example 12, the subject matter of Examples 1-11 includes, a rule generator device configured to: generate a plurality of packet sniffing rules based on an initial query set; and generate a plurality of brokering and sniffing rules based on the plurality of packet sniffing rules; wherein the plurality of sniffed packet samples is generated based on the plurality of brokering and sniffing rules.

In Example 13, the subject matter of Examples 1-12 includes, a decryption device configured to: receive a plurality of encrypted network packets from a network access point; and decrypting the encrypted network packets to produce a plurality of decrypted network packets; wherein generating the plurality of analytically derived sniffed packets is further based on the plurality of decrypted network packets.

Example 14 is a method for edge computing infrastructure threat analysis, the method comprising: receiving a plurality of sniffed packet samples from a plurality of brokering packet sniffers; generating a sniffing analytics output at a packet sniffing analytics device based on the plurality of sniffed packet samples; generating a revised packet sniffing target list based on the sniffing analytics output; generating a packet sniffing instruction based on the revised packet sniffing target list; causing the packet sniffing instruction to be executed at the plurality of brokering packet sniffers; and receiving a plurality of analytically derived sniffed packets from the plurality of brokering packet sniffers based on the packet sniffing instruction.

In Example 15, the subject matter of Example 14 includes, wherein the plurality of brokering packet sniffers includes a plurality of network sniffer agents configured to: implement an initial sniffer configuration based on packet sniffing instruction; determine a target within the revised packet sniffing target list is not captured within the plurality of analytically derived sniffed packets; and implement a revised sniffer configuration based on the revised packet sniffing target list.

In Example 16, the subject matter of Examples 14-15 includes, wherein the plurality of brokering packet sniffers includes at least one of an intelligent network interface controller (NIC) sniffer, a field-programmable gate array (FPGA) sniffer, a Peripheral Component Interconnect Express bus sniffer, a system-on-a-chip (SOC) sniffer, or an infrastructure processing unit (IPU) sniffer.

In Example 17, the subject matter of Examples 14-16 includes, wherein the packet sniffing instruction includes a statistical packet collection framework, the statistical packet collection framework to instruct a packet sniffer to collect one copy of a target packet and a count of the target packet.

In Example 18, the subject matter of Example 17 includes, the packet sniffing instruction to instruct the packet sniffer to generate a network packet hash table, the network packet hash table mapping a plurality of redundant packets through a packet hash function to a single hash value corresponding to the target packet.

In Example 19, the subject matter of Examples 14-18 includes, identifying an analytically derived network edge packet sniffing location with an edge computing infrastructure; deploying an edge packet sniffer at the analytically derived network edge packet sniffing location to the plurality of brokering packet sniffers; and generating a portion of the plurality of analytically derived sniffed packets from the analytically derived network edge packet sniffing location.

In Example 20, the subject matter of Examples 14-19 includes, generating a revised network address watchlist at the packet sniffing analytics device based on the plurality of sniffed packet samples, wherein generating the plurality of analytically derived sniffed packets at the plurality of brokering packet sniffers is further based on the revised network address watchlist.

In Example 21, the subject matter of Example 20 includes, generating a revised packet sniffing query based on the revised network address watchlist; and generating a revised attribute list based on the revised packet sniffing query; wherein generating the plurality of analytically derived sniffed packets at the plurality of brokering packet sniffers is further based on the revised attribute list.

In Example 22, the subject matter of Examples 20-21 includes, determining that a number of abandoned connections from a source address transgresses an abandoned connection threshold, wherein the revised packet sniffing query includes a traffic arrival rate query to determine whether a network traffic rate transgresses a traffic rate threshold.

In Example 23, the subject matter of Examples 20-22 includes, generating a revised blocklist and a revised passlist at the packet sniffing analytics device based on the plurality of sniffed packet samples, wherein generating the plurality of analytically derived sniffed packets at the plurality of brokering packet sniffers is further based on the revised blocklist and the revised passlist.

In Example 24, the subject matter of Examples 14-23 includes, receiving telemetry driven packet sniffing queries; and generating a plurality of packet sniffing telemetry metrics based on the telemetry driven packet sniffing queries; wherein generating the sniffing analytics output is further based on the plurality of packet sniffing telemetry metrics.

In Example 25, the subject matter of Examples 14-24 includes, generating a plurality of packet sniffing rules based on an initial query set; and generating a plurality of brokering and sniffing rules based on the plurality of packet sniffing rules; wherein the plurality of sniffed packet samples is generated based on the plurality of brokering and sniffing rules.

In Example 26, the subject matter of Examples 14-25 includes, receiving a plurality of encrypted network packets from a network access point; and decrypting the encrypted network packets to produce a plurality of decrypted network packets; wherein generating the plurality of analytically derived sniffed packets is further based on the plurality of decrypted network packets.

Example 27 is at least one non-transitory machine-readable storage medium, comprising a plurality of instructions that, responsive to being executed with processing circuitry of a computer-controlled device, cause the processing circuitry to: generate a plurality of sniffed packet samples at a plurality of brokering packet sniffers; generate a sniffing analytics output at a packet sniffing analytics device based on the plurality of sniffed packet samples; generate a revised packet sniffing target list based on the sniffing analytics output; and generate a plurality of analytically derived sniffed packets at the plurality of brokering packet sniffers based on the revised packet sniffing target list.

In Example 28, the subject matter of Example 27 includes, wherein the plurality of brokering packet sniffers includes a plurality of network sniffer agents configured to: implement an initial sniffer configuration based on packet sniffing instruction; determine a target within the revised packet sniffing target list is not captured within the plurality of analytically derived sniffed packets; and implement a revised sniffer configuration based on the revised packet sniffing target list.

In Example 29, the subject matter of Examples 27-28 includes, wherein the plurality of brokering packet sniffers includes at least one of an intelligent network interface controller (NIC) sniffer, a field-programmable gate array (FPGA) sniffer, a Peripheral Component Interconnect Express bus sniffer, a system-on-a-chip (SOC) sniffer, or an infrastructure processing unit (IPU) sniffer.

In Example 30, the subject matter of Examples 27-29 includes, wherein the packet sniffing instruction includes a statistical packet collection framework, the statistical packet collection framework to instruct a packet sniffer to collect one copy of a target packet and a count of the target packet.

In Example 31, the subject matter of Example 30 includes, the packet sniffing instruction to instruct the packet sniffer to generate a network packet hash table, the network packet hash table mapping a plurality of redundant packets through a packet hash function to a single hash value corresponding to the target packet.

In Example 32, the subject matter of Examples 27-31 includes, the plurality of instructions further causing the processing circuitry to: identify an analytically derived network edge packet sniffing location with an edge computing infrastructure; deploy an edge packet sniffer at the analytically derived network edge packet sniffing location to the plurality of brokering packet sniffers; and generate a portion of the plurality of analytically derived sniffed packets from the analytically derived network edge packet sniffing location.

In Example 33, the subject matter of Examples 27-32 includes, the plurality of instructions further causing the processing circuitry to generate a revised network address watchlist at the packet sniffing analytics device based on the plurality of sniffed packet samples, wherein the plurality of analytically derived sniffed packets at the plurality of brokering packet sniffers is further based on the revised network address watchlist.

In Example 34, the subject matter of Example 33 includes, the plurality of instructions further causing the processing circuitry to: generate a revised packet sniffing query based on the revised network address watchlist; and generate a revised attribute list based on the revised packet sniffing query; wherein the plurality of analytically derived sniffed packets at the plurality of brokering packet sniffers is further based on the revised attribute list.

In Example 35, the subject matter of Examples 33-34 includes, the plurality of instructions further causing the processing circuitry to determine that a number of abandoned connections from a source address transgresses an abandoned connection threshold, wherein the revised packet sniffing query includes a traffic arrival rate query to determine whether a network traffic rate transgresses a traffic rate threshold.

In Example 36, the subject matter of Examples 33-35 includes, the plurality of instructions further causing the processing circuitry to generate a revised blocklist and a revised passlist at the packet sniffing analytics device based on the plurality of sniffed packet samples, wherein the plurality of analytically derived sniffed packets at the plurality of brokering packet sniffers is further based on the revised blocklist and the revised passlist.

In Example 37, the subject matter of Examples 27-36 includes, the plurality of instructions further causing the processing circuitry to: receive telemetry driven packet sniffing queries; and generate a plurality of packet sniffing telemetry metrics based on the telemetry driven packet sniffing queries; wherein the sniffing analytics output is further based on the plurality of packet sniffing telemetry metrics.

In Example 38, the subject matter of Examples 27-37 includes, the plurality of instructions further causing the processing circuitry to: generate a plurality of packet sniffing rules based on an initial query set; and generate a plurality of brokering and sniffing rules based on the plurality of packet sniffing rules; wherein the plurality of sniffed packet samples is based on the plurality of brokering and sniffing rules.

In Example 39, the subject matter of Examples 27-38 includes, the plurality of instructions further causing the processing circuitry to: receive a plurality of encrypted network packets from a network access point; and decrypt the encrypted network packets to produce a plurality of decrypted network packets; wherein the plurality of analytically derived sniffed packets is further based on the plurality of decrypted network packets.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for edge computing infrastructure threat analysis, the system comprising:
   a plurality of brokering packet sniffers within an edge computing network configured to generate a plurality of sniffed packet samples; and
   a packet sniffing analytics device configured to:
   generate a sniffing analytics output based on the plurality of sniffed packet samples;
   generate a revised packet sniffing target list based on the sniffing analytics output; and
   generate a packet sniffing instruction based on the revised packet sniffing target list;
   wherein the plurality of brokering packet sniffers is further configured to generate a plurality of analytically derived sniffed packets at the plurality of brokering packet sniffers based on the packet sniffing instruction.

2. The system of claim 1, wherein the plurality of brokering packet sniffers includes a plurality of network sniffer agents configured to:
   implement an initial sniffer configuration based on packet sniffing instruction;

determine a target within the revised packet sniffing target list is not captured within the plurality of analytically derived sniffed packets; and implement a revised sniffer configuration based on the revised packet sniffing target list.

3. The system of claim 1, wherein the plurality of brokering packet sniffers includes at least one of an intelligent network interface controller (NIC) sniffer, a field-programmable gate array (FPGA) sniffer, a Peripheral Component Interconnect Express bus sniffer, a system-on-a-chip (SOC) sniffer, or an infrastructure processing unit (IPU) sniffer.

4. The system of claim 1, wherein the packet sniffing instruction includes a statistical packet collection framework, the statistical packet collection framework to instruct a packet sniffer to collect one copy of a target packet and a count of the target packet.

5. The system of claim 4, the statistical packet collection framework further to instruct the packet sniffer to generate a network packet hash table, the network packet hash table mapping a plurality of redundant packets through a packet hash function to a single hash value corresponding to the target packet.

6. The system of claim 1, the packet sniffing analytics device further configured to:
identify an analytically derived network edge packet sniffing location with an edge computing infrastructure; and
deploy an edge packet sniffer at the analytically derived network edge packet sniffing location, the edge packet sniffer forming a part of the plurality of brokering packet sniffers;
wherein a portion of the plurality of analytically derived sniffed packets is generated at the analytically derived network edge packet sniffing location.

7. The system of claim 1, the packet sniffing analytics device further configured to generate a revised network address watchlist based on the plurality of sniffed packet samples, wherein the plurality of analytically derived sniffed packets is further based on the revised network address watchlist.

8. The system of claim 7, further including a query generation device configured to:
generate a revised packet sniffing query based on the revised network address watchlist; and
generate a revised attribute list based on the revised packet sniffing query;
wherein the plurality of analytically derived sniffed packets is further based on the revised attribute list.

9. The system of claim 8, the packet sniffing analytics device further to determine that a number of abandoned connections from a source address transgresses an abandoned connection threshold, wherein the revised packet sniffing query includes a traffic arrival rate query to determine whether a network traffic rate transgresses a traffic rate threshold.

10. The system of claim 7, the packet sniffing analytics device is further configured to generate a revised blocklist and a revised passlist at the packet sniffing analytics device based on the plurality of sniffed packet samples, wherein the plurality of analytically derived sniffed packets is further based on the revised blocklist and the revised passlist.

11. The system of claim 1, further including a telemetry device configured to:
receive telemetry driven packet sniffing queries; and
generating a plurality of packet sniffing telemetry metrics based on the telemetry driven packet sniffing queries;
wherein the sniffing analytics output is further based on the plurality of packet sniffing telemetry metrics.

12. The system of claim 1, further including a rule generator device configured to:
generate a plurality of packet sniffing rules based on an initial query set; and
generate a plurality of brokering and sniffing rules based on the plurality of packet sniffing rules;
wherein the plurality of sniffed packet samples is generated based on the plurality of brokering and sniffing rules.

13. The system of claim 1, further including a decryption device configured to:
receive a plurality of encrypted network packets from a network access point; and
decrypting the encrypted network packets to produce a plurality of decrypted network packets;
wherein generating the plurality of analytically derived sniffed packets is further based on the plurality of decrypted network packets.

14. A method for edge computing infrastructure threat analysis, the method comprising:
receiving a plurality of sniffed packet samples from a plurality of brokering packet sniffers;
generating a sniffing analytics output at a packet sniffing analytics device based on the plurality of sniffed packet samples;
generating a revised packet sniffing target list based on the sniffing analytics output;
generating a packet sniffing instruction based on the revised packet sniffing target list;
causing the packet sniffing instruction to be executed at the plurality of brokering packet sniffers; and
receiving a plurality of analytically derived sniffed packets from the plurality of brokering packet sniffers based on the packet sniffing instruction.

15. The method of claim 14, wherein the plurality of brokering packet sniffers includes a plurality of network sniffer agents configured to:
implement an initial sniffer configuration based on packet sniffing instruction;
determine a target within the revised packet sniffing target list is not captured within the plurality of analytically derived sniffed packets; and
implement a revised sniffer configuration based on the revised packet sniffing target list.

16. The method of claim 14, wherein the packet sniffing instruction includes a statistical packet collection framework, the statistical packet collection framework to instruct a packet sniffer to collect one copy of a target packet and a count of the target packet.

17. The method of claim 16, the packet sniffing instruction to instruct the packet sniffer to generate a network packet hash table, the network packet hash table mapping a plurality of redundant packets through a packet hash function to a single hash value corresponding to the target packet.

18. The method of claim 14, further including:
identifying an analytically derived network edge packet sniffing location with an edge computing infrastructure;
deploying an edge packet sniffer at the analytically derived network edge packet sniffing location to the plurality of brokering packet sniffers; and
generating a portion of the plurality of analytically derived sniffed packets from the analytically derived network edge packet sniffing location.

19. The method of claim 14, further including generating a revised network address watchlist at the packet sniffing analytics device based on the plurality of sniffed packet samples, wherein generating the plurality of analytically derived sniffed packets at the plurality of brokering packet sniffers is further based on the revised network address watchlist.

20. The method of claim 19, further including:
generating a revised packet sniffing query based on the revised network address watchlist; and
generating a revised attribute list based on the revised packet sniffing query;
wherein generating the plurality of analytically derived sniffed packets at the plurality of brokering packet sniffers is further based on the revised attribute list.

21. The method of claim 14, further including:
receiving telemetry driven packet sniffing queries; and
generating a plurality of packet sniffing telemetry metrics based on the telemetry driven packet sniffing queries;
wherein generating the sniffing analytics output is further based on the plurality of packet sniffing telemetry metrics.

22. At least one non-transitory machine-readable storage medium, comprising a plurality of instructions that, responsive to being executed with processing circuitry of a computer-controlled device, cause the processing circuitry to:
generate a plurality of sniffed packet samples at a plurality of brokering packet sniffers;
generate a sniffing analytics output at a packet sniffing analytics device based on the plurality of sniffed packet samples;
generate a revised packet sniffing target list based on the sniffing analytics output; and
generate a plurality of analytically derived sniffed packets at the plurality of brokering packet sniffers based on the revised packet sniffing target list.

23. The at least one non-transitory machine-readable storage medium of claim 22, wherein the plurality of brokering packet sniffers includes a plurality of network sniffer agents configured to:
implement an initial sniffer configuration based on packet sniffing instruction;
determine a target within the revised packet sniffing target list is not captured within the plurality of analytically derived sniffed packets; and
implement a revised sniffer configuration based on the revised packet sniffing target list.

24. The at least one non-transitory machine-readable storage medium of claim 22, wherein the plurality of brokering packet sniffers includes at least one of an intelligent network interface controller (NIC) sniffer, a field-programmable gate array (FPGA) sniffer, a Peripheral Component Interconnect Express bus sniffer, a system-on-a-chip (SOC) sniffer, or an infrastructure processing unit (IPU) sniffer.

25. The at least one non-transitory machine-readable storage medium of claim 22, the plurality of instructions further causing the processing circuitry to:
identify an analytically derived network edge packet sniffing location with an edge computing infrastructure;
deploy an edge packet sniffer at the analytically derived network edge packet sniffing location to the plurality of brokering packet sniffers; and
generate a portion of the plurality of analytically derived sniffed packets from the analytically derived network edge packet sniffing location.

* * * * *